(12) United States Patent
Thangarasa et al.

(10) Patent No.: US 11,849,395 B2
(45) Date of Patent: Dec. 19, 2023

(54) ADAPTING WAKE UP SIGNAL REPETITIONS

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE); Hazhir Shokri Razaghi, Solna (SE); Sandeep Narayanan Kadan Veedu, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 391 days.

(21) Appl. No.: 17/269,738

(22) PCT Filed: Aug. 8, 2019

(86) PCT No.: PCT/EP2019/071364
§ 371 (c)(1),
(2) Date: Feb. 19, 2021

(87) PCT Pub. No.: WO2020/038732
PCT Pub. Date: Feb. 27, 2020

(65) Prior Publication Data
US 2021/0321334 A1    Oct. 14, 2021

Related U.S. Application Data

(60) Provisional application No. 62/719,743, filed on Aug. 20, 2018.

(51) Int. Cl.
*H04W 52/02* (2009.01)
*H04W 4/70* (2018.01)
(Continued)

(52) U.S. Cl.
CPC ......... *H04W 52/0232* (2013.01); *H04W 4/70* (2018.02); *H04W 4/80* (2018.02); *H04W 52/0245* (2013.01); *H04W 76/28* (2018.02)

(58) Field of Classification Search
None
See application file for complete search history.

(56) References Cited

U.S. PATENT DOCUMENTS 10,841,876 B2 * 11/2020 Bhattad ................ H04W 72/21
2012/0163422 A1    6/2012 Lee et al.
(Continued)

FOREIGN PATENT DOCUMENTS

| CN | 104335643 A | 2/2015 |
|----|-------------|--------|
| CN | 107735975 A | 2/2018 |
| WO | 2018139967 A1 | 8/2018 |

OTHER PUBLICATIONS

International Search Report and Written Opinion dated Oct. 21, 2019 for International Application No. PCT/EP2019/071364 filed Aug. 8, 2019, consisting of 11-pages.
(Continued)

*Primary Examiner* — German Viana Di Prisco
(74) *Attorney, Agent, or Firm* — Christopher & Weisberg, P.A.

(57) ABSTRACT

A method, network node and wireless device for determining wake up signal (WUS) repetitions are disclosed. According to one aspect, a method implemented in a wireless device, WD, includes determining information about a transmit antenna configuration of a network node; determining information about an activity level of the WD; determining a number of wake up signal, WUS, repetitions based on the transmit antenna configuration and the activity level; and receiving a WUS signal, the WUS signal having at least the determined number of WUS repetitions. A method implemented in a network node includes obtaining information
(Continued)

about an activity level of a wireless device, WD; selecting a transmit antenna configuration; determining a number of wake up signal, WUS, repetitions based on the transmit antenna configuration and the activity level; and transmitting a WUS signal, the WUS signal having at least the determined number of WUS repetitions.

20 Claims, 13 Drawing Sheets

(51) Int. Cl.
*H04W 76/28* (2018.01)
*H04W 4/80* (2018.01)

(56) References Cited

U.S. PATENT DOCUMENTS

| 2020/0029302 | A1* | 1/2020 | Cox | H04W 68/02 |
| 2020/0359323 | A1* | 11/2020 | Beale | H04W 52/0229 |
| 2021/0007054 | A1* | 1/2021 | Jiang | H04W 52/0216 |

OTHER PUBLICATIONS

3GPP TSG RAN WG1 Meeting #92 R1-1802333; Title: WUS signal design; Agenda Item: 6.2.6.1.1.3; Source: Qualcomm Incorporated; Document for: Discussion and Decision: Date and Location: Feb. 26-Mar. 2, 2018, Athens, Greece, consisting of 11-pages.
3GPP TSG RAN WG1 Meeting #92bis R1-1804920; Title: Detailed design for WUS signal design; Agenda Item: 6.2.7.1.1.3; Source: Qualcomm Incorporated; Document for: Discussion and Decision: Date and Location: FApr. 16-20, 2018, Sanya, China, consisting of 17-pages.
3GPP TSG RAN WG1 Meeting #93 R1-1807104; Title: Remaining issues on QUS for MTC; Agenda Item: 6.2.6.3; Source: Qualcomm Incorporated; Document for: Discussion and Decision: Date and Location: May 21-25, 2018, Busan, Korea, consisting of 12-pages.
3GPP TSG-RAN WG1 #89 R1-1706887; Title: Power consumption reduction for paging and connected-mode DRX for NB-IoT; Agenda Item: 6.2.7.1.1; Source: Ericsson; Document for: Discussion, Decision: Date and Location: May 15-19, 2017, Hangzhou, P.R. China, consisting of 5-pages.
Japanese Office Action and English Summary dated Jun. 17, 2022 for Application No. 2021-509848 consisting of 8 pages.
3GPP TSG RAN WG1 Meeting #90bis R1-1718141; Title: Wake-up signal configurations and procedures; Agenda Item: 6.2.6.1.1.2; Source: Qualcomm Incorporated; Document for: Discussion and Decision: Date and Location: Oct. 9-13, 2017, Prague, Czechia, consisting of 9-pages.
3GPP TSG RAN WG1 Meeting #93 R1-1807109; Title: Detailed design for Wake-up signal sequence; Agenda Item: 6.2.7.1.1.3; Source: Qualcomm Incorporated; Document for: Discussion and Decision: Date and Location: May 21-25, 2018, Busan Korea, consisting of 14-pages.
3GPP TSG RAN WG4 Meeting #87 R4-1807606; Title: Discussions on RRM requirements for WUS for Rel-15 NB-IOT; Agenda Item: 6.19.4.4; Source: Ericsson; Document for: Discussion: Date and Location: 2018, Busan, Republic of Korea, consisting of 4-pages.
3GPP TSG-RAN WG4 Meeting #88 R4-1810769; Title: Remaining work on minimum WUS reception requirements for NB-IoT; Source to WG: Ericsson; Location and Date: Gothenburg, Sweden, Aug. 20-24, 2018, consisting of 2 pages.
Chinese Office Action and English Translation dated Sep. 21, 2023 for Application No. 201980069008.4, consisting of 53 pages.

\* cited by examiner

ADAPTING WAKE UP SIGNAL REPETITIONS

CROSS-REFERENCE TO RELATED APPLICATIONS

This application is a Submission Under 35 U.S.C. § 371 for U.S. National Stage Patent Application of International Application No.: PCT/EP2019/071364, filed Aug. 8, 2019 entitled "ADAPTING WAKE UP SIGNAL REPETITIONS," which claims priority to U. S. Provisional Application No.: 62/719,743, entitled "METHODS FOR ADAPTING WAKE UP SIGNAL REPETITIONS BASED ON TRANSMISSION SCHEMES AND WIRELESS DEVICE ACTIVITY LEVELS" filed Aug. 20, 2018, the entireties of both of which are incorporated herein by reference.

TECHNICAL FIELD

The present disclosure relates to wireless communications, and in particular, to adapting wake up signal repetitions, for example, based on transmission schemes and wireless device (WD) activity levels.

BACKGROUND

There has been a lot of work in the Third Generation Partnership Project (3GPP) lately on specifying technologies to cover Machine-to-Machine (M2M) and/or Internet of Things (IoT) related use cases. Work for 3GPP Release 13 and 14 includes enhancements to support Machine-Type Communications (MTC) with new WD categories (Cat-M1, Cat-M2), supporting reduced bandwidth of 6 physical resource blocks (PRBs) (up to 24 PRBs for Cat-M2), and Narrowband IoT (NB-IoT) WDs providing a new radio interface (and WD categories, Cat-NB1 and Cat-NB2).

Long Term Evolution (LTE) enhancements have been introduced in 3GPP Release 13, 14 and 15 for MTC as "eMTC", including support for bandwidth limited WDs, Cat-M1, and support for coverage enhancements. This is to separate discussion from NB-IoT (notation here used for any Release), although the supported features are similar on a general level.

There are multiple differences between "legacy" LTE devices and the procedures and channels defined for eMTC and for NB-IoT. Some important differences include a new physical channel, such as the physical downlink control channels, called MPDCCH in eMTC and NPDCCH in NB-IoT, and a new physical random access channel, NPRACH, for NB-IoT. Another difference is the coverage level (also known as coverage enhancement level) that these technologies can support. By applying repetitions to the transmitted signals and channels, both eMTC and NB-IoT allow WDs to operate at much lower signal to noise ratio (SNR) levels compared to LTE, i.e., $Es/Iot \geq -15$ dB being the lowest operating point for eMTC and NB-IoT which can be compared to $-6$ dB $Ês/IoT$ for "legacy" LTE.

In 3GPP Release 15, there is a common objective in the approved work items (WI) for both NB-IoT and Rel-15 enhancements for eMTC. The description for NB-IoT is as follows:

A. Work on the following objectives to commence from Radio Access Network (RAN) #75 (according to TU allocation per Working Group (WG)) and strive for completion by RAN #78:
Further latency and power consumption reduction; and
Power consumption reduction for physical channels
a) Study and, if found beneficial, specify for idle mode paging and/or connected mode discontinuous reception (DRX), physical signal/channel that can be efficiently decoded or detected prior to decoding NPDCCH/NPDSCH. [RAN1, RAN2, RAN4]

And with a similar formulation for eMTC:
Improved power consumption:
Power consumption reduction for physical channels [RAN1 lead, RAN2, RAN4]
a) Study and, if found beneficial for idle mode paging and/or connected mode DRX, specify physical signal/channel that can be efficiently decoded or detected prior to decoding the physical downlink control/data channel.

A 'Wake-up signal' (WUS) is based on the transmission of a short signal that indicates to the WD that it should continue to decode the downlink (DL) control channel, e.g., full MPDCCH (eMTC) or NPDCCH (NB-IoT). If such signal is absent (discontinuous transmission (DTX), i.e., WD does not detect it) then the WD can go back to sleep without decoding the DL control channel. The decoding time for a WUS is considerably shorter than that of the full MPDCCH or NPDCCH. This in turn reduces WD power consumption and leads to longer WD battery life (this is presented in R1-1706887). The 'Wake-up signal' (WUS) would be transmitted only when there is paging for the WD. But if there is no paging for the WD then the WUS will not be transmitted (i.e., implying a discontinuous transmission, DTX) and the WD would go back to sleep, e.g., upon detecting DTX instead of WUS.

Coverage in eMTC and NB-IoT

Cell coverage in both eMTC and NB-IoT is controlled by the maximum number of repetitions of DL channels (e.g. MPDCCH, physical downlink shared channel (PDSCH), NPDCCH, NPDSCH etc.), Rmax, used for transmitting a message. The Rmax values may be defined in values from 1 to 2048, where the next value is a doubling of the previous one. The coverage of a specific number of repetitions, R, is not only dependent on Rmax, but also on the message size, since a longer message typically requires a higher R compared to a shorter R, provided the same coverage. Paging messages using the xPDCCH (MPDCCH for eMTC and NPDCCH for NB-IoT) are typically the same size (not the same number of repetitions of that message, though) for a given cell, providing a constant maximum coverage.

DRX Cycle Operation

In LTE, a DRX cycle is used to enable the WD to conserve power of its battery. The DRX cycle is used in radio resource control (RRC) idle state but it can also be used in RRC connected state. Examples of lengths of DRX cycles currently used in RRC idle state are 320 ms, 640 ms, 1.28 seconds (s) and 2.56 s. Examples of lengths of DRX cycles currently used in RRC connected state may range from 2 ms to 2.56 s. The enhanced DRX (eDRX) cycles are expected to be very long, e.g., ranging from several seconds to several minutes and even up to one or more hours. Typical values of eDRX cycles may be between 4-10 minutes.

The DRX cycle is configured by the network node and may be characterized by the following parameters:
On duration: During the on duration of the DRX cycle, a timer called 'onDurationTimer', which is configured by the network node, is running. This timer specifies the number of consecutive control channel subframes (e.g., PDCCH, ePDCCH subframe(s)) at the beginning of a DRX Cycle. It is also interchangeably called a DRX ON period. More specifically it is the duration in downlink subframes that the WD after waking up from DRX to receive control channel (e.g. PDCCH, ePDCCH). If the WD successfully decodes the control channel (e.g. PDCCH, ePDCCH) during the ON duration then the WD starts a DRX-inactivity timer (see below) and stays awake until its expiry. When the onDurationTimer is running, the WD is considered to be in DRX state of the DRX cycle.

DRX-inactivity timer: This timer specifies the number of consecutive control channel (e.g. PDCCH, ePDCCH) subframe(s) after the subframe in which a control channel (e.g. PDCCH) indicates an initial uplink (UL) or DL user data transmission for this medium access control (MAC) entity. It is also configured by the network node. When the DRX-inactivity timer is running, the WD is considered to be in non-DRX state, i.e., no DRX is used.

Active time: This time is the duration during which the WD monitors the control channel (e.g. PDCCH, ePDCCH). In other words, this is the total duration during which the WD is awake. This includes the "on-duration" of the DRX cycle, the time during which the WD is performing continuous reception while the inactivity timer has not expired and the time the WD is performing continuous reception while waiting for a DL retransmission after one hybrid automatic repeat request (HARM) round trip time (RTT). The minimum active time is equal to the length of an on duration, and the maximum active time is undefined (infinite).

Examples of the DRX ON and DRX OFF durations of the DRX cycle are shown in FIG. 1. DRX operation with more detailed parameters in LTE is illustrated in FIG. 2.

The DRX configuration described herein may also be an enhanced or extended DRX (eDRX) configuration. In legacy DRX related procedures, the WD can be configured with a DRX cycle length of up to 2.56 seconds. But WDs supporting extended DRX (eDRX) can be configured with a DRX cycle at least longer than 2.56 seconds and typically much longer than 2.56 seconds, i.e., in order of several seconds to several minutes. The eDRX configuration parameters include an eDRX cycle length, paging window length (also called a paging time window (PTW) length), etc. Within a PTW of the eDRX, the WD is further configured with one or more legacy DRX cycles.

The Wake-up signal (WUS), as described above, was introduced in 3GPP Release 15 for both eMTC and NB-IoT. Hence, a WD will wake-up and attempt to receive the WUS in order to know if it should further attempt to detect MPDCCH (for eMTC) and NPDCCH (for NB-IoT), referred to herein as xPDCCH for short. Since the WUS is only transmitted if a subsequent xPDCCH will be transmitted, most often, there will be no signal for the WD to detect. Both eMTC and NB-IoT WDs can operate under different coverage enhancement levels and can be configured with different WD activity levels, aka DRX cycle lengths. The required number of repetitions to successfully decode WUS increases with the coverage levels, and also with DRX cycle lengths. Current specifications do not specify how the WUS should be transmitted and received in order to improve the gain of a WUS application, e.g., to reach good trade-off between WD power consumption and network resource utilization. If WUS is not configured properly or less appropriately in the network, it can be very costly for the network as a large number of repetitions may be needed to reach a WD. This in turn may result in increased power consumption for network node and WD, and waste of resources as they cannot be used for serving other WDs or transmitting other signals/channels. Large number of repetitions may also increase interference due to increase in the activity due to frequent transmissions.

SUMMARY

Some embodiments advantageously provide methods, network nodes, and wireless devices for adapting wake up signal repetitions based on transmission schemes and wireless device (WD) activity levels. Some embodiments may have one or more of the following advantages:

Transmission of a WUS using fewer repetitions under certain scenarios which can result in reduced network/WD power consumption and faster detection of WUS in the WD;

Efficient usage of network resources;

Interference is reduced; and/or

The network capacity is enhanced.

According to one aspect, a network node includes processing circuitry configured to determine a number of WUS repetitions based on a wireless device (WD) activity level and a transmit antenna configuration. The processing circuitry is further configured to cause transmission to the WD, a WUS repetitively according to the determined number of WUS repetitions.

In a first aspect of a first network (NW) embodiment, the network node determines at least information about the transmit antenna configuration and a WD activity level, and based on this information, adapts wake-up signal (WUS) transmission parameters (e.g., WUS repetitions) for transmitting a WUS signal in a cell, and transmit the WUS signal in the cell using the determined transmission parameters. The activity level may include one or more of a DRX cycle configuration and a WD bit-rate, and is an indication of a state of network synchronization of the WD such that a lower activity implies less synchronization compared to the higher activity level. The transmit antenna configuration information may include, e.g., the number of transmit antennas used in the serving network node for transmitting a certain signal/channel (e.g., the WUS).

The network node may support at least two different antenna configurations. The network node may support transmission of signals using one of the plurality of different antenna configurations supported by the network node. For example, a first transmit antenna configuration and a second transmit antenna configuration may include one transmit antenna and two transmit antennas, respectively. In another example, the second transmit antenna configuration may include more than two transmit antennas, e.g., 4 antennas, etc. Adapting of a WUS transmission method herein includes changing or modifying or switching between the WUS transmission methods, e.g., changing the number repetitions used for transmitting the WUS, changing the number of transmit antennas used for transmitting the WUS compared to an initially planned transmission method or the previously used method. This can solve the problem of using unnecessarily large (in some cases extreme) number of repetitions for transmitting the WUS.

In a first aspect of a first WD embodiment, the WD determines at least information about the transmit antenna configuration used in a cell and a WD activity level, and based on this information, obtains information about WUS transmission parameters (e.g., WUS repetitions) used for transmitting the WUS signal in a cell, and based on the obtained information receives the WUS signal in the cell. The activity level may include one or more of the same parameters as described in the network node embodiment.

To achieve this, the WD may attempt to detect the WUS by selecting one out of a plurality of WD receiver configurations or procedures or methods supported by the WD. For example, the WD may use one of at least two receiver procedures based on a determined WUS repetition level, which is associated with its activity level and the transmit antenna configuration, e.g., procedure A and procedure B. For example, procedure A is used for receiving the WUS from one of multiple transmit antennas of the network node. In procedure B, the WD receives the WUS from at least two transmit antennas, e.g., by switching between the different antennas in different time resources, or by combining the signals from the different antennas, etc.

According to an aspect of the disclosure, a wireless device, WD, configured to communicate with a network node (16). The WD (22) comprises processing circuitry (84), the processing circuitry (84) being configured to cause the WD (22) to determine (e.g. receive) information about a transmit antenna configuration of the network node (16). The processing circuitry is further configured to cause the WD to determine information about an activity level of the WD. The processing circuitry is further configured to receive a number of wake up signal, WUS, repetitions, the number of repetitions being based on (i.e. dependent on) the determined transmit antenna configuration and the activity level.

According to one aspect of the present disclosure, a wireless device, WD, configured to communicate with a network node is provided. The WD includes processing circuitry. The processing circuitry is configured to cause the WD to determine information about a transmit antenna configuration of the network node. The processing circuitry is further configured to cause the WD to determine information about an activity level of the WD. The processing circuitry is further configured to cause the WD to determine a number of wake up signal, WUS, repetitions based on the transmit antenna configuration and the activity level. The processing circuitry is further configured to cause the WD to receive a WUS signal, the WUS signal comprising at least the determined number of WUS repetitions.

In some embodiments of this aspect, the processing circuitry is further configured to cause the WD to: when the WUS signal is received, monitor a control channel. In some embodiments of this aspect, the processing circuitry is further configured to cause the WD to receive the WUS signal by being configured to cause the WD to decode the WUS signal according to the determined number of WUS repetitions. In some embodiments of this aspect, the processing circuitry is further configured to cause the WD to decode the WUS signal according to the determined number of WUS repetitions by being configured to cause the WD to combine WUS transmissions received a number of times equal to the determined number of WUS repetitions. In some embodiments of this aspect, the activity level is a discontinuous reception, DRX, cycle length. In some embodiments of this aspect, the processing circuitry is further configured to cause the WD to determine the number of WUS repetitions based on the transmit antenna configuration and the activity level by being configured to cause the WD to: select the number of WUS repetitions from a table, the table mapping repetitions to DRX cycle lengths. In some embodiments of this aspect, the table from which the number of WUS repetitions is selected depends on whether a coverage level of the WD is enhanced. In some embodiments of this aspect, the coverage level is expressed as one of a received signal quality and a received signal strength, such that the number of WUS repetitions depends on the one of the received signal quality and the received signal strength.

In some embodiments of this aspect, the information about the transmit antenna configuration of the network node comprises a number of transmit antennas used by the network node for transmitting the WUS signal. In some embodiments of this aspect, the number of transmit antennas is one of 1 transmit antenna and 2 transmit antennas. In some embodiments of this aspect, the processing circuitry is further configured to cause the WD to determine the number of WUS repetitions by being configured to cause the WD to determine the number of WUS repetitions based on the activity level being one of equal to 5.12 seconds, greater than 5.12 seconds and less than 5.12 seconds. In some embodiments of this aspect, the WD is one of a Machine Type Communication, MTC, WD and a Narrowband Internet of Things, NB-IoT, WD.

According to another aspect of the present disclosure, a network node configured to communicate with a wireless device, WD, is provided. The network node includes processing circuitry. The processing circuitry is configured to cause the network node to obtain information about an activity level of the WD. The processing circuitry is configured to cause the network node to select a transmit antenna configuration. The processing circuitry is configured to cause the network node to determine a number of wake up signal, WUS, repetitions based on the transmit antenna configuration and the activity level. The processing circuitry is configured to cause the network node to transmit a WUS signal, the WUS signal comprising at least the determined number of WUS repetitions (e.g. the WUS signal comprising the determined number of WUS repetitions).

In some embodiments of this aspect, the processing circuitry is further configured to cause the network node to transmit the WUS signal if a control channel is to be transmitted. In some embodiments of this aspect, the processing circuitry is further configured to cause the network node to subsequent to transmitting the WUS signal, transmit the control channel. In some embodiments of this aspect, the selected transmit antenna configuration includes a number of transmit antennas to be used to transmit the WUS signal; and the processing circuitry is further configured to cause the network node to transmit the WUS signal by being configured to transmit the WUS signal using the number of transmit antennas. In some embodiments of this aspect, the processing circuitry is further configured to cause the network node to transmit information about the selected transmit antenna configuration to the WD. In some embodiments of this aspect, the activity level of the WD is a discontinuous reception, DRX, cycle length. In some embodiments of this aspect, the processing circuitry is further configured to cause the network node to determine the number of WUS repetitions based on the transmit antenna configuration and the activity level by being configured to cause the network node to select the number of WUS repetitions from a table, the table mapping repetitions to DRX cycle lengths. In some embodiments of this aspect, the table from which the number of WUS repetitions is selected depends on whether a coverage level of the WD is enhanced. In some embodiments of this aspect, the coverage level is expressed as one of a received signal quality and a received signal strength, such that the number of WUS repetitions depends on the one of the received signal quality and the received signal strength.

In some embodiments of this aspect, the selected transmit antenna configuration comprises a selected number of transmit antennas to transmit the WUS signal. In some embodiments of this aspect, the selected number of transmit antennas is one of 1 transmit antenna and 2 transmit antennas. In some embodiments of this aspect, the processing circuitry is further configured to cause the network node to determine the number of WUS repetitions by being configured to cause the network node to determine the number of WUS repetitions based on the activity level being one of equal to 5.12 seconds, greater than 5.12 seconds and less than 5.12 seconds. In some embodiments of this aspect, the WD is one of a Machine Type Communication, MTC, WD and a Narrowband Internet of Things, NB-IoT, WD.

In an aspect, a method implemented in a wireless device, WD, is provided. The method includes determining information about a transmit antenna configuration of a network node. The method includes determining information about an activity level of the WD. The WD receives a number of wake up signal, WUS, repetitions, the number of repetitions being based on (i.e. dependent on) the determined transmit antenna configuration and the activity level.

According to another aspect of the present disclosure, a method implemented in a wireless device, WD, is provided. The method includes determining information about a transmit antenna configuration of a network node. The method includes determining information about an activity level of the WD. The method includes determining a number of wake up signal, WUS, repetitions based on the transmit antenna configuration and the activity level. The method includes receiving a WUS signal, the WUS signal comprising at least the determined number of WUS repetitions.

In some embodiments of this aspect, the method further includes when the WUS signal is received, monitoring a control channel. In some embodiments of this aspect, receiving the WUS signal further comprises decoding the WUS signal according to the determined number of WUS repetitions. In some embodiments of this aspect, decoding the WUS signal according to the determined number of WUS repetitions further comprises combining WUS transmissions received a number of times equal to the determined number of WUS repetitions. In some embodiments of this aspect, the activity level is a discontinuous reception, DRX, cycle length. In some embodiments of this aspect, determining the number of WUS repetitions based on the transmit antenna configuration and the activity level further comprises selecting the number of WUS repetitions from a table, the table mapping repetitions to DRX cycle lengths. In some embodiments of this aspect, the table from which the number of WUS repetitions is selected depends on whether a coverage level of the WD is enhanced. In some embodiments of this aspect, the coverage level is expressed as one of a received signal quality and a received signal strength, such that the number of WUS repetitions depends on the one of the received signal quality and the received signal strength.

In some embodiments of this aspect, the information about the transmit antenna configuration of the network node comprises a number of transmit antennas used by the network node for transmitting the WUS signal. In some embodiments of this aspect, the number of transmit antennas is one of 1 transmit antenna and 2 transmit antennas. In some embodiments of this aspect, determining the number of WUS repetitions further comprises determining the number of WUS repetitions based on the activity level being one of equal to 5.12 seconds, greater than 5.12 seconds and less than 5.12 seconds. In some embodiments of this aspect, the WD is one of a Machine Type Communication, MTC, WD and a Narrowband Internet of Things, NB-IoT, WD.

According to yet another aspect of the present disclosure, a method implemented in a network node is provided. The method includes obtaining information about an activity level of a wireless device, WD. The method includes selecting a transmit antenna configuration. The method includes determining a number of wake up signal, WUS, repetitions based on the transmit antenna configuration and the activity level. The method includes transmitting a WUS signal, the WUS signal comprising at least the determined number of WUS repetitions.

In some embodiments of this aspect, the transmitting the WUS signal further includes transmitting the WUS signal if a control channel is to be transmitted. In some embodiments of this aspect, the method further includes subsequent to transmitting the WUS signal, transmitting the control channel. In some embodiments of this aspect, the selected transmit antenna configuration includes a number of transmit antennas to be used to transmit the WUS signal; and transmitting the WUS signal further comprises transmitting the WUS signal using the number of transmit antennas. In some embodiments of this aspect, the method further includes transmitting information about the selected transmit antenna configuration to the WD. In some embodiments of this aspect, the activity level of the WD is a discontinuous reception, DRX, cycle length. In some embodiments of this aspect, the determining the number of WUS repetitions based on the transmit antenna configuration and the activity level further comprises selecting the number of WUS repetitions from a table, the table mapping repetitions to DRX cycle lengths. In some embodiments of this aspect, the table from which the number of WUS repetitions is selected depends on whether a coverage level of the WD is enhanced. In some embodiments of this aspect, the coverage level is expressed as one of a received signal quality and a received signal strength, such that the number of WUS repetitions depends on the one of the received signal quality and the received signal strength.

In some embodiments of this aspect, the selected transmit antenna configuration comprises a selected number of transmit antennas to transmit the WUS signal. In some embodiments of this aspect, the selected number of transmit antennas is one of 1 transmit antenna and 2 transmit antennas. In some embodiments of this aspect, determining the number of WUS repetitions further comprises determining the number of WUS repetitions based on the activity level being one of equal to 5.12 seconds, greater than 5.12 seconds and less than 5.12 seconds. In some embodiments of this aspect, the WD is one of a Machine Type Communication, MTC, WD and a Narrowband Internet of Things, NB-IoT, WD.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
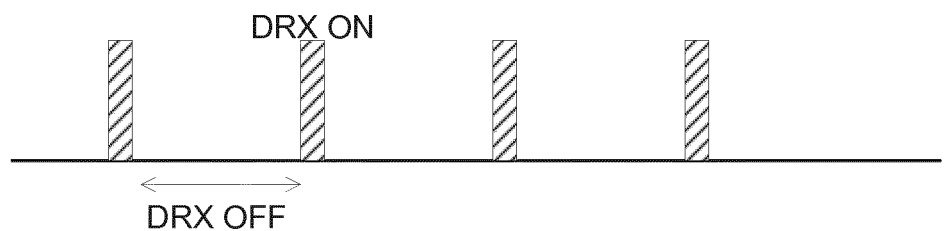
FIG. 1 is diagram of example DRX ON and DRX OFF durations of the DRX cycle.
Figure 2:
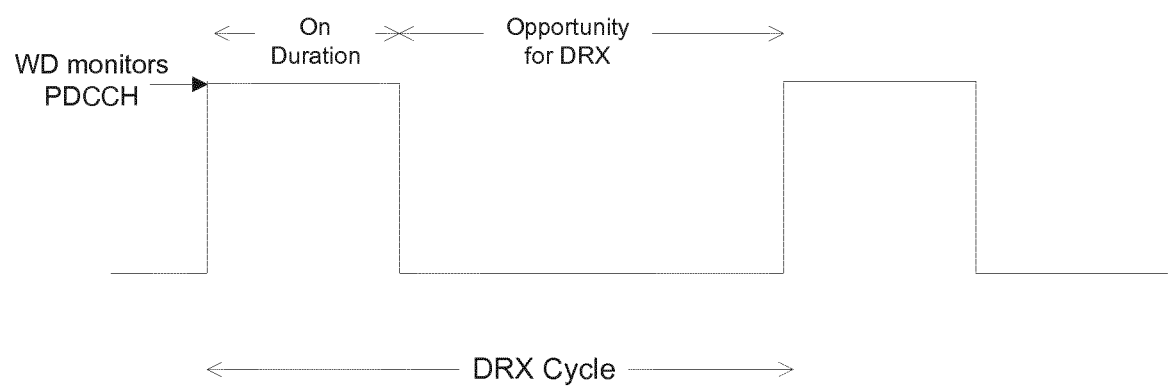
FIG. 2 is a diagram of DRX operation with more detailed parameters in LTE.

Before describing in detail exemplary embodiments, it is noted that the embodiments reside primarily in combinations of apparatus components and processing steps related to adapting wake up signal repetitions based on transmission schemes and wireless device (WD) activity levels. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like reference designators refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD (or UE) herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. For example, disclosure referring to LTE may also be applicable to NR. Examples of the disclosure may also apply to other wireless systems, including without limitation, Wide Band Code Division Multiple Access (WCDMA), Worldwide Interoperability for Microwave Access (WiMax), Ultra Mobile Broadband (UMB) and Global System for Mobile Communications (GSM), which may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The embodiments are described for LTE, e.g., MTC and NB-IoT. However, the embodiments are applicable to any RAT or multi-RAT systems, where the WD receives and/or transmit signals (e.g. data), e.g., LTE frequency division duplex (FDD)/time division duplex (TDD), wideband code division multiple access (WCDMA)/high speed packet access (HSPA), global system for mobile communications (GSM)/GSM edge radio access network (GERAN), Wi Fi, wireless local area network (WLAN), CDMA2000, fifth generation (5G), New Radio (NR), etc.

The term "time resource" used herein may correspond to any type of physical resource or radio resource expressed in terms of length of time. Examples of time resources are: symbol, mini-slot, time slot, subframe, radio frame, transmission time interval (TTI), short TTI, interleaving time, etc.

In a scenario including a WD served by a first cell (cell1), Cell1 is managed or served or operated by a network node (NW1), e.g., a base station. The WD operates in a certain coverage enhancement (CE) level with respect to a certain cell, e.g., with respect to cell1. The WD is configured to receive signals (e.g. paging, WUS, NPDCCH, NPDCCH, MPDSCH, PDSCH etc.) from at least cell1. The WD may further be configured to perform one or more measurements on cell1 and on one or more additional cells, e.g., neighbor cells.

The coverage enhancement (CE) level of the WD is also interchangeably called coverage level of the WD. The CE level can be expressed in terms of:
  received signal quality and/or received signal strength at the WD with respect to a cell; and/or
  received signal quality and/or received signal strength at a cell with respect to the WD.

The CE level of the WD can be defined with respect to any cell such as serving cell, a neighbor cell, a reference cell, etc. For example, it can be expressed in terms of received signal quality and/or received signal strength at the WD with respect to a target cell on which the WD performs one or more radio measurements. Examples of signal quality are SNR, signal to interference plus noise ratio (SINR), channel quality index (CQI), narrowband received signal received quality (NRSRQ), RSRQ, cell specific reference signal (CRS) Ês/Iot, shared channel (SCH) Ês/Iot etc. Examples of signal strength are path loss, couple loss, received signal received power (RSRP), NRSRP, SCH_RP, etc. The notation Ês/Iot is defined as ratio of
  Ês, which is the received energy per resource element (RE) (power normalized to the subcarrier spacing) during the useful part of the symbol, i.e., excluding the cyclic prefix, at the WD antenna connector, to
  Iot, which is the received power spectral density of the total noise and interference for a certain RE (power integrated over the RE and normalized to the subcarrier spacing) as measured at the WD antenna connector The CE level can be expressed in at least two different levels. Consider an example of two different CE levels defined with respect to signal quality (e.g. SNR) at the WD including:
  Coverage enhancement level 1 (CE1) including SNR≥−6 dB at WD with respect to a cell; and
  Coverage enhancement level 2 (CE2) including −15 dB≤SNR <−6 dB at the WD with respect to a cell.

In the above example, the CE1 may also be interchangeably called a normal coverage level (NCL), baseline coverage level, reference coverage level, basic coverage level, legacy coverage level, etc. On the other hand, CE2 may be called an enhanced coverage level or extended coverage level (ECL).

In another example, two different coverage levels (e.g., normal coverage and enhanced coverage) may be defined in terms of signal quality levels as follows:
  The requirements for normal coverage are applicable for the WD category NB1 with respect to a cell provided that radio conditions of the WD with respect to that cell are defined as follows SCH Ês/Iot <−6 dB and CRS Ês/Iot >−6.
  The requirements for enhanced coverage are applicable for the WD category NB1 with respect to a cell provided that radio conditions of the WD with respect to that cell are defined as follows SCH Ês/Iot −15 dB and CRS Ês/Iot −15.

In another example, one or more parameters defining CE of the WD with respect to a cell (e.g., serving cell, neighbor cell, etc.) may also be signaled to the WD by the network node. Examples of such parameters are CE Mode A and CE Mode B signaled to WD category M1, WD category M2, etc. The WD configured with CE Mode A and CE Mode B are also said to operate in normal coverage and enhanced coverage respectively. For example:

The requirements for CE Mode A apply provided the WD category M1 or WD category M2 is configured with CE Mode A, SCH Ês/Iot >−6 dB and CRS Ês/Iot >−6 dB.

The requirements for CE Mode B shall apply provided the WD category M1 or WD category M2 is configured with CE Mode B, SCH Ês/Iot >−15 dB and CRS Ês/Iot >−15 dB.

In another example, the WD may also determine the CE level with respect to a cell (e.g., cell1, etc.) during the random access transmission procedure to that cell. For example, the WD selects the random access transmission resources (e.g., repetition level of random access (RA) channels) which are associated with different CE levels (e.g., PRACH CE level 0, CE level 1, CE level 2, etc.) based on the received signal level (e.g., RSRP, NRSRP etc.). The WD selects or determines the CE level (e.g., PRACH CE level) based on the signal measurement results performed by the WD (e.g., RSRP, NRSRP, path loss).

In general, in larger CE levels, the WD is configured to operate under received signal level (e.g., RSRP, path loss, SNR, SINR, Ês/Iot, RSRQ, etc.) which is lower than the received signal level in smaller CE level. The embodiments are applicable for any number of CE levels of the WD with respect to a cell, e.g., CE1, CE2, CE3, CE4, etc. In this example, CE1 corresponds to the smallest CE level, while CE2 corresponds to a larger CE level than CE1 but smaller than. CE3 and CE3 corresponds to a larger CE level than. CE2 but smaller than CE4, and so on.

Figure 3:
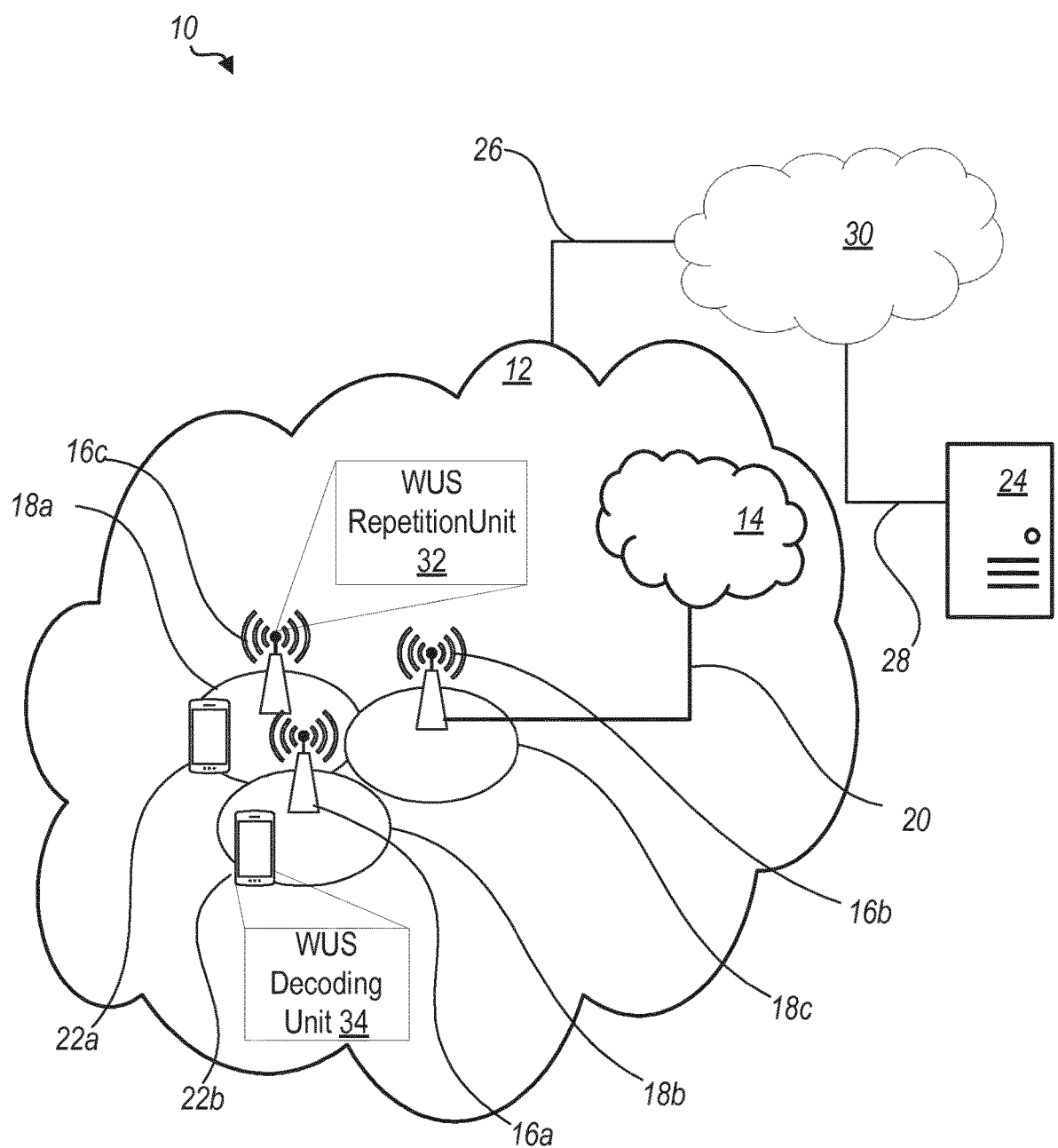
FIG. 3 is a schematic diagram of an exemplary network architecture illustrating a communication system connected via an intermediate network to a host computer according to the principles in the present disclosure.

Returning to the drawing figures, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a WUS Repetition unit 32 which is configured to determine a number of WUS repetitions. In some embodiments, WUS Repetition unit 32 is configured to at least one of: obtain information about an activity level of the WD; select a transmit antenna configuration; determine a number of wake up signal, WUS, repetitions based on the transmit antenna configuration and the activity level; and transmit a WUS signal, the WUS signal comprising the determined number of WUS repetitions. In some aspects, the WUS signal comprises at least the determined number of WUS repetitions.

A wireless device 22 is configured to include a WUS Decoding unit 34 which is configured to decode a WUS by, for example, combining WUS transmissions. In some embodiments, WUS Decoding unit 34 is configured to at least one: determine information about a transmit antenna configuration of the network node; determine information about an activity level of the WD; determine a number of wake up signal, WUS, repetitions based on the transmit antenna configuration and the activity level; and receive a WUS signal, the WUS signal comprising at least the determined number of WUS repetitions.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include WUS Repetition unit 32 configured to perform the network node methods and/or arrangements described herein, such as, for example, those described with reference to the flowchart in FIG. 9.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WUS Decoding unit 34 configured to perform the wireless device 22 methods and/or arrangements described herein, such as, for example, those described with reference to the flowchart in FIG. 10.

Figure 4:
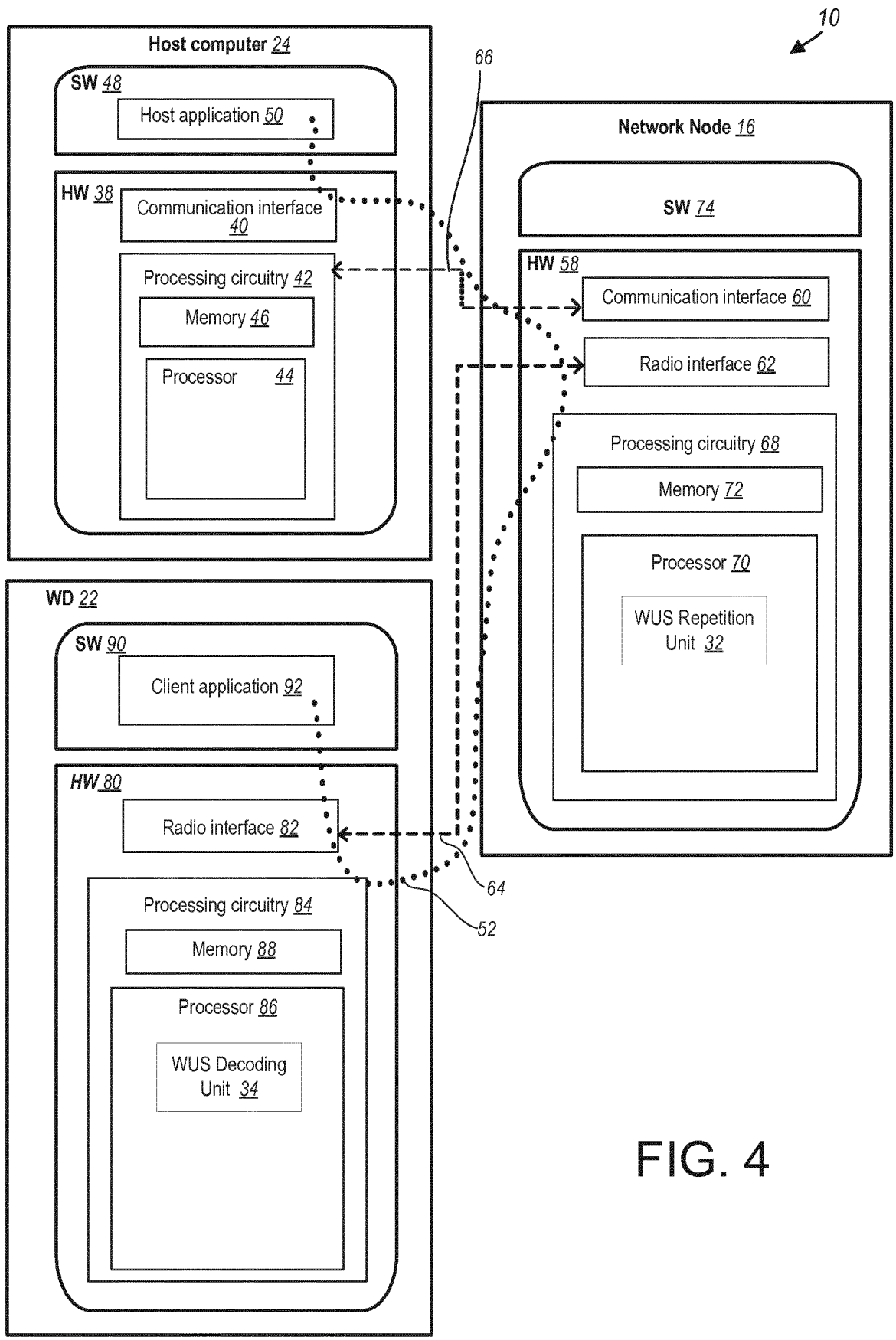
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both.

While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as WUS Repetition unit 32, and WUS Decoding unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
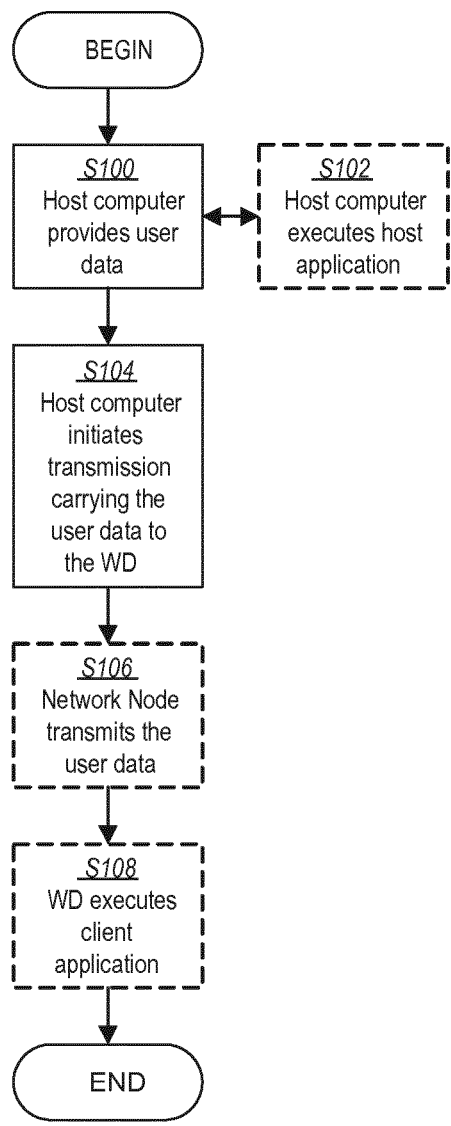
FIG. 5 is a flow chart illustrating exemplary methods implemented in a communication system including a host computer, a network node and a wireless device for executing a client application at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiates, in accordance with the teachings of the embodiments described throughout this disclosure (block S106). In an optional fourth step, the WD 22 executes a client application, such as, for example, the client application 114, associated with the host application 50 executed by the host computer 24 (block S108).

Figure 6:
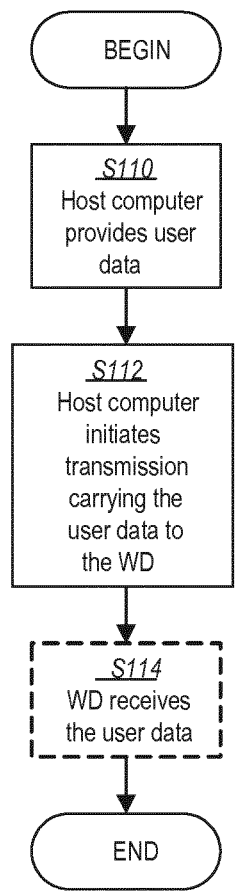
FIG. 6 is a flow chart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 7:
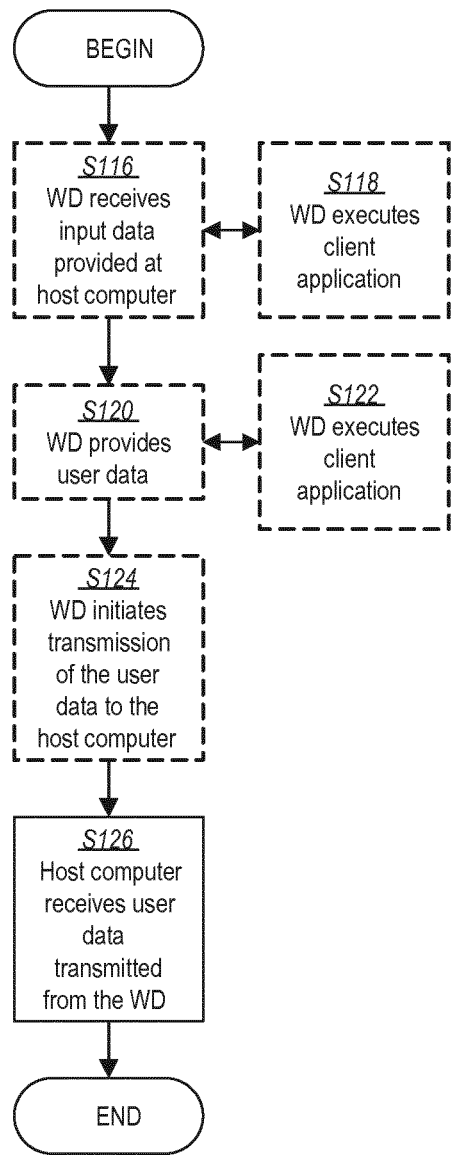
FIG. 7 is a flow chart illustrating exemplary methods implemented in a communication system including a host computer, a network node and a wireless device for receiving user data from the wireless device at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 8:
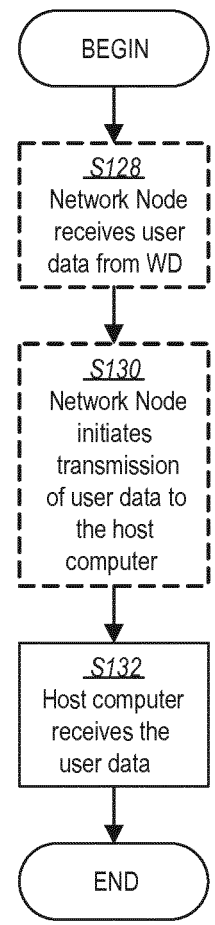
FIG. 8 is a flow chart illustrating exemplary methods implemented in a communication system including a host computer, a network node and a wireless device for receiving user data at a host computer according to some embodiments of the present disclosure.

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 9:
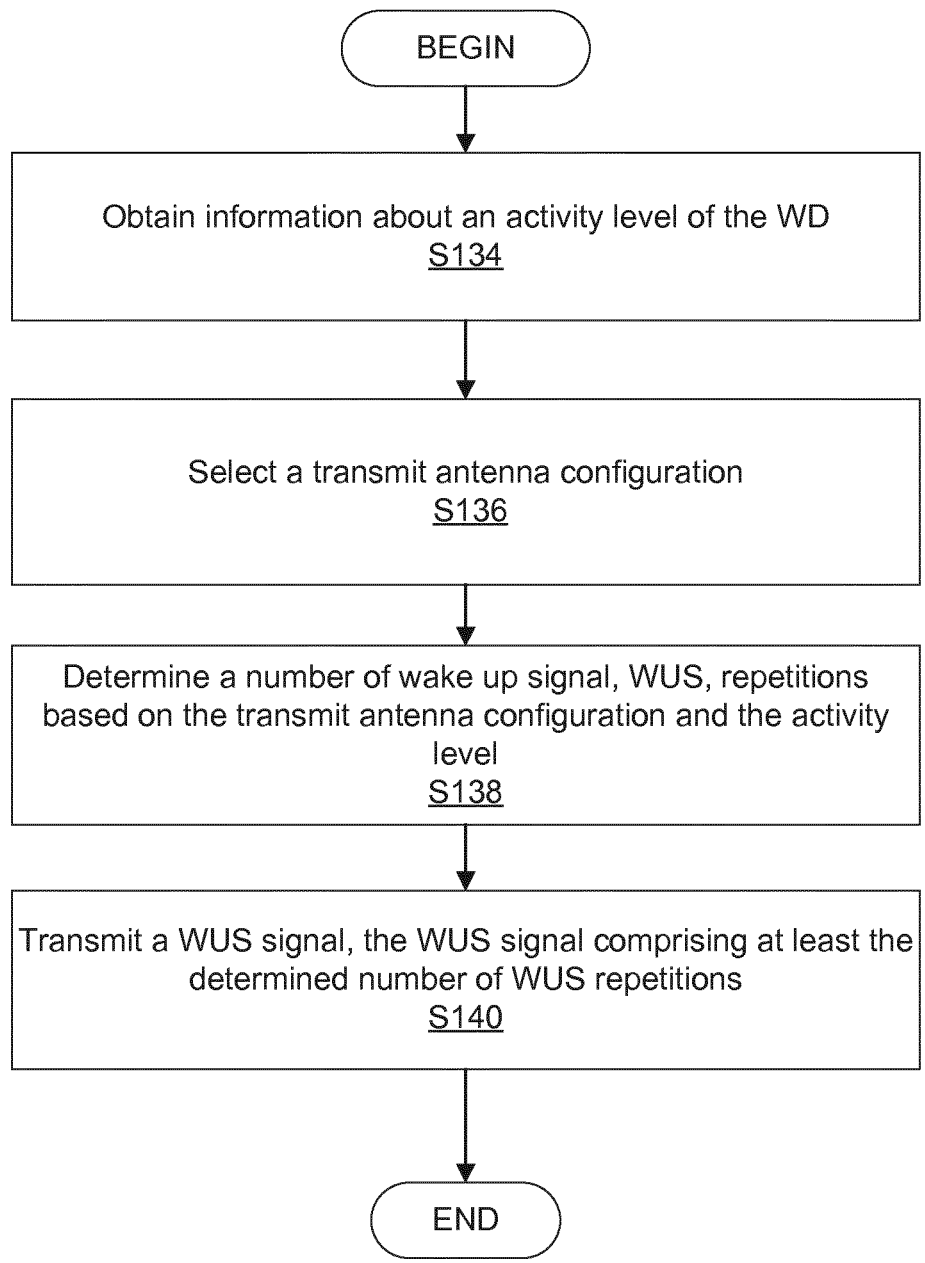
FIG. 9 is a flowchart of an exemplary process in a network node according to some embodiments of the present disclosure.

FIG. 9 is a flowchart of an exemplary process in a network node 16 according to some embodiments of the present disclosure. One or more Blocks and/or functions and/or methods performed by the network node 16 may be performed by one or more elements of network node 16 such as by WUS Repetition unit 32 in processing circuitry 68, processor 70, radio interface 62, etc. according to the example method. The example method includes obtaining (block S134), such as via WUS Repetition unit 32, processing circuitry 68, processor 70 and/or radio interface 62, information about an activity level of a wireless device, WD, 22. The method may include selecting (block S136), such as via WUS Repetition unit 32, processing circuitry 68, processor 70 and/or radio interface 62, a transmit antenna configuration. The method may include determining (block S138), such as via WUS Repetition unit 32, processing circuitry 68, processor 70 and/or radio interface 62, a number of wake up signal, WUS, repetitions based on the transmit antenna configuration and the activity level. The method may include transmitting (block S140), such as via WUS Repetition unit 32, processing circuitry 68, processor 70 and/or radio interface 62, a WUS signal, the WUS signal comprising at least the determined number of WUS repetitions.

In some embodiments, the transmitting the WUS signal further includes transmitting the WUS signal if a control channel is to be transmitted. In some embodiments, the method includes subsequent to transmitting the WUS signal, transmitting, such as via WUS Repetition unit 32, processing circuitry 68, processor 70 and/or radio interface 62, the control channel. In some embodiments, the selected transmit antenna configuration includes a number of transmit antennas to be used to transmit the WUS signal; and transmitting the WUS signal further includes transmitting the WUS signal using the number of transmit antennas. In some embodiments, the method further includes transmitting, such as via WUS Repetition unit 32, processing circuitry 68, processor 70 and/or radio interface 62, information about the selected transmit antenna configuration to the WD 22.

In some embodiments, the activity level of the WD 22 is a discontinuous reception, DRX, cycle length. In some embodiments, the determining the number of WUS repetitions based on the transmit antenna configuration and the activity level further comprises selecting, such as via WUS Repetition unit 32, processing circuitry 68, processor 70 and/or radio interface 62, the number of WUS repetitions from a table. The table may map repetitions to DRX cycle lengths. In some embodiments, the table from which the number of WUS repetitions is selected depends on whether a coverage level of the WD is enhanced. As such, the number of WUS repetitions may be considered as dependent on whether (or not) a coverage level of the WD is enhanced. In some embodiments, the coverage level is expressed as one of a received signal quality and a received signal strength, such that the number of WUS repetitions depends on the one of the received signal quality and the received signal strength.

In some embodiments, the selected transmit antenna configuration includes a selected number of transmit antennas to transmit the WUS signal. In some embodiments, the selected number of transmit antennas is one of 1 transmit antenna and 2 transmit antennas. In some embodiments, determining the number of WUS repetitions further includes determining, such as via WUS Repetition unit 32, processing circuitry 68, processor 70 and/or radio interface 62, the number of WUS repetitions based on the activity level being one of equal to 5.12 seconds, greater than 5.12 seconds and less than 5.12 seconds. In some embodiments, the WD 22 is one of a Machine Type Communication, MTC, WD and a Narrowband Internet of Things, NB-IoT, WD. In some embodiments, the table from which the number of WUS repetitions is selected depends on the transmit antenna configuration.

In some embodiments, the process includes determining, via the processing circuitry 68, a WD activity level and selecting a transmit antenna configuration. The process further includes determining, via the WUS Repetition unit 32, a number of wake up signal, WUS, repetitions based on the WD activity level and the transmit antenna configuration (block S136). The process also includes transmitting, via the radio interface 62, to the WD a WUS repetitively according to the determined number of WUS repetitions.

Figure 10:
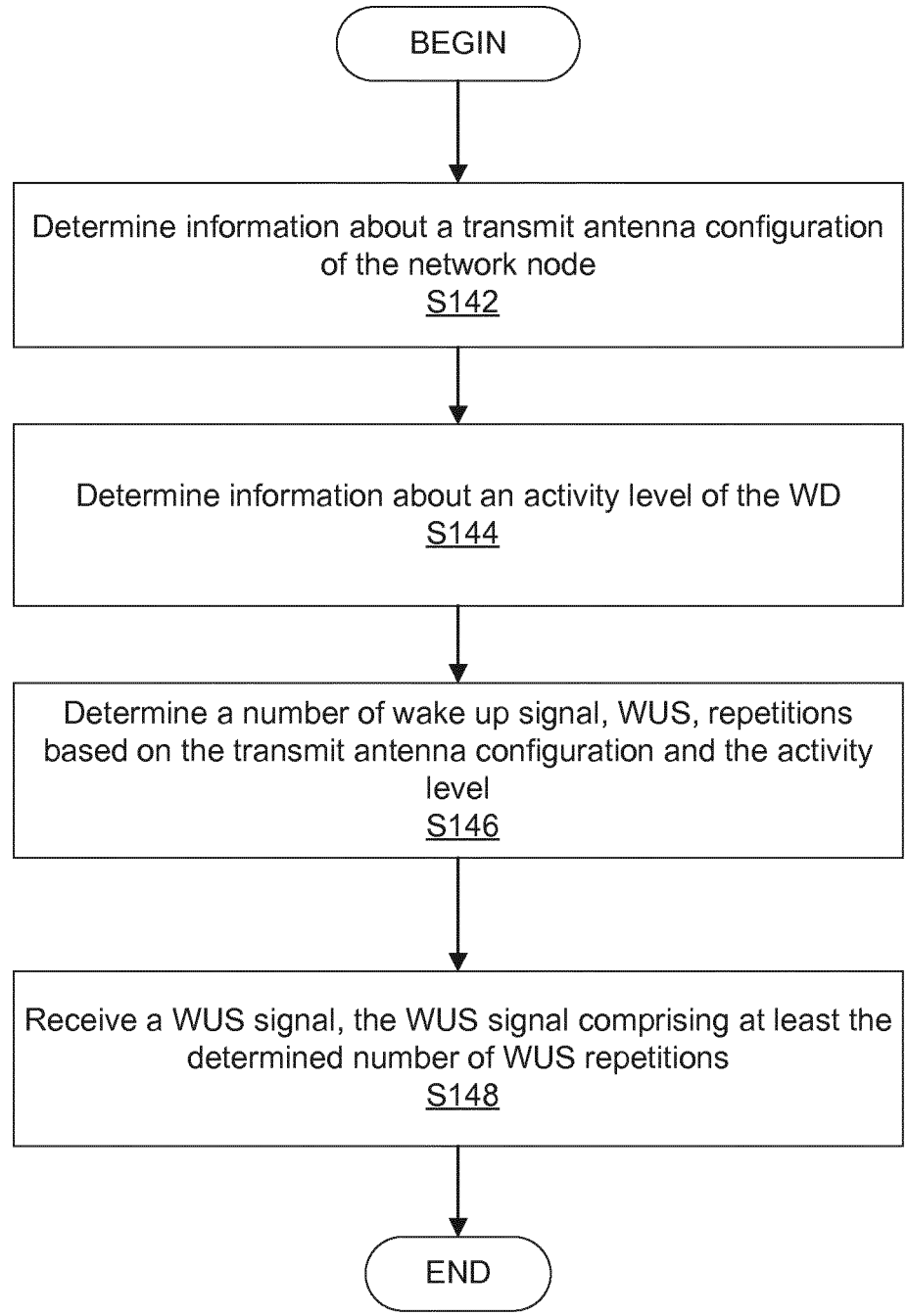
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions and/or methods performed by WD 22 may be performed by one or more elements of WD 22 such as by WUS Decoding unit 34 in processing circuitry 84, processor 86, radio interface 82, etc. The example method includes determining (block S142), such as via WUS Decoding unit 34, processing circuitry 84, processor 86 and/or radio interface 82, information about a transmit antenna configuration of a network node 16. The method includes determining (block S144), such as via WUS Decoding unit 34, processing circuitry 84, processor 86 and/or radio interface 82, information about an activity level of the WD 22. The method includes determining (block S146), such as via WUS Decoding unit 34, processing circuitry 84, processor 86 and/or radio interface 82, a number of wake-up signal, WUS, repetitions expected to be received, based on the transmit antenna configuration and the activity level. In some aspects, the signal transmitted to the wireless device comprises a plurality of repeated wake up signals, the number of wake up signals being the number of repetitions. In some examples, the transmitted signal (and received) signal may be referred to as a wake up signal comprising the defined number of repetitions of the wake up signal (i.e. WUS repetitions). The method includes receiving (block S148), such as via WUS Decoding unit 34, processing circuitry 84, processor 86 and/or radio interface 82, a WUS signal, the WUS signal comprising at least the determined number of WUS repetitions.

In some embodiments, the method further includes when the WUS signal is received, monitoring, such as via WUS Decoding unit 34, processing circuitry 84, processor 86 and/or radio interface 82, a control channel. In some embodiments, receiving the WUS signal further includes decoding, such as via WUS Decoding unit 34, processing circuitry 84, processor 86 and/or radio interface 82, the WUS signal according to the determined number of WUS repetitions. In some embodiments, decoding the WUS signal according to the determined number of WUS repetitions further includes combining, such as via WUS Decoding unit 34, processing circuitry 84, processor 86 and/or radio interface 82, WUS transmissions received a number of times equal to the determined number of WUS repetitions.

In some embodiments, the activity level is a discontinuous reception, DRX, cycle length.

In some embodiments, determining the number of WUS repetitions based on the transmit antenna configuration and the activity level further includes selecting, such as via WUS Decoding unit 34, processing circuitry 84, processor 86 and/or radio interface 82, the number of WUS repetitions from a table. The table may map repetitions to DRX cycle lengths. In some aspects, the number of WUS repetitions may be considered as additionally based on whether (or not) a coverage level of the WD is enhanced. In some embodiments, the table from which the number of WUS repetitions is selected depends on whether a coverage level of the WD is enhanced. In some embodiments, the coverage level is expressed as one of a received signal quality and a received signal strength, such that the number of WUS repetitions depends on one or more of the received signal quality and the received signal strength.

In some embodiments, the information about the transmit antenna configuration of the network node 16 includes a number of transmit antennas used by the network node 16 for transmitting the WUS signal. In some embodiments, the number of transmit antennas is one of 1 transmit antenna and 2 transmit antennas. In some embodiments, determining the number of WUS repetitions further includes determining, such as via WUS Decoding unit 34, processing circuitry 84, processor 86 and/or radio interface 82, the number of WUS repetitions based on the activity level being one of equal to 5.12 seconds, greater than 5.12 seconds and less than 5.12 seconds. In some embodiments, the WD 22 is one of a Machine Type Communication, MTC, WD and a Narrowband Internet of Things, NB-IoT, WD. In some embodiments, the table from which the number of WUS repetitions is selected depends on the transmit antenna configuration In some embodiments, the process includes receiving, via the radio interface 82, information about a transmit antenna configuration from the network node 16 and determining an activity level of the WD. The process also includes determining, via the processing circuitry 84, a number of wake up signal, WUS, repetitions based on the transmit antenna configuration and the activity level (block S142). The process further includes decoding, via the WUS Decoding unit 34, a WUS by combining received wake up signals a number of times equal to the determined number of WUS repetitions.

Having described the general process flow of arrangements of the disclosure and having provided examples of hardware and software arrangements for implementing the processes and functions of the disclosure, the sections below provide details and examples of arrangements for adapting wake up signal repetitions based on transmission schemes and wireless device (WD) activity levels.

Figure 11:
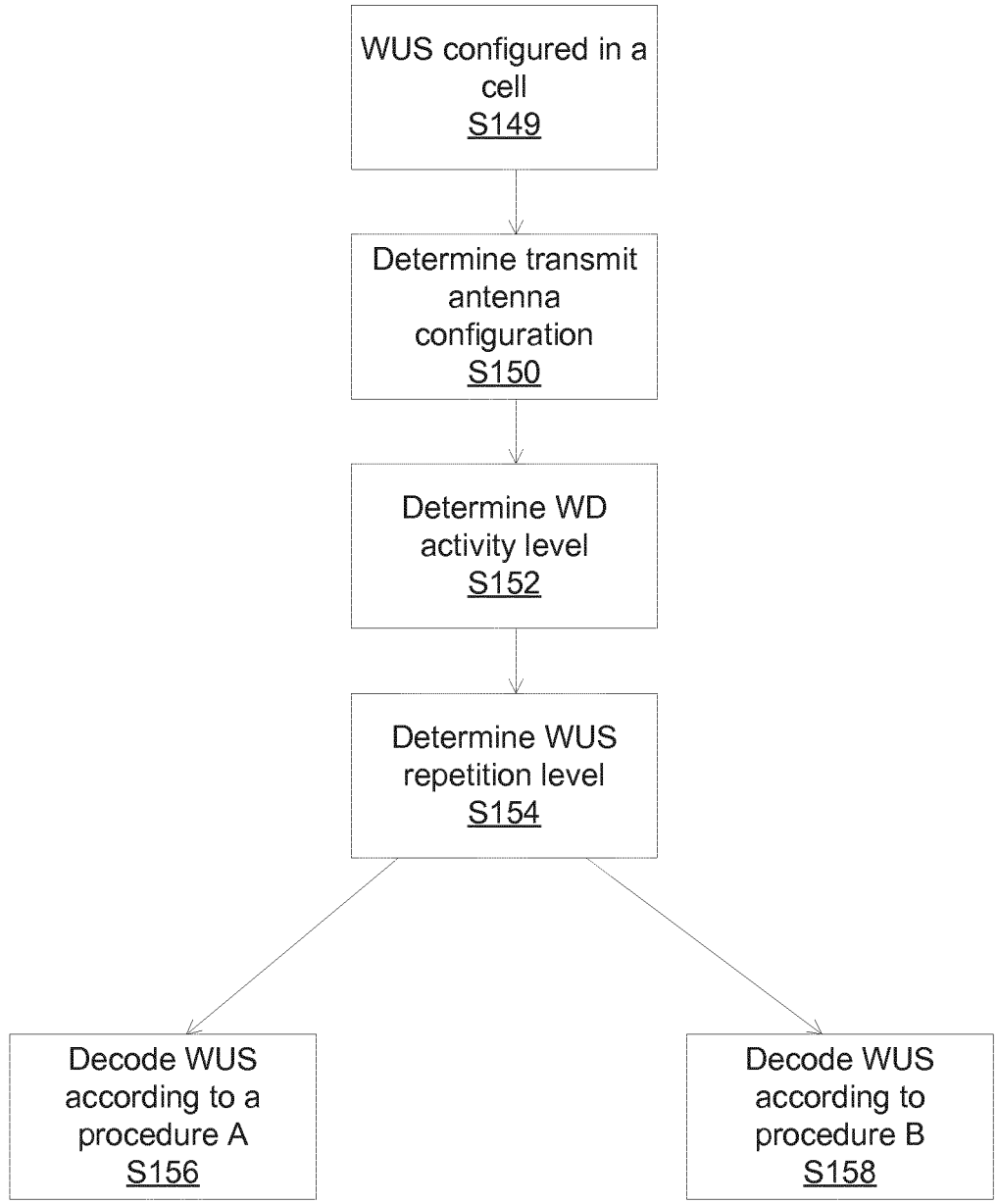
FIG. 11 is a flowchart of an exemplary process in a wireless device according to some embodiments of the present disclosure.

One embodiment is a method in a wireless device (WD) which is attempting to detect a wake-up signal (WUS). The WUS is used by the WD 22 to know if the WD 22 should continue to decode a DL control channel (e.g. xDPCCH such as MPDCCH, NPDCCH etc.) or go back to sleep. The WUS is transmitted from a wireless network node 16 (e.g., a base station, such as an eNB) when the node is attempting to page the WD. FIG. 11 illustrates a flow chart of some embodiments. As is shown in the initial unnumbered box, the process of FIG. 11 assumes that the WUS is configured in a cell (block S149).

Determining Transmit Antenna Configuration

In a first step (block S150), the WD obtains information about the WD transmit antennas configuration used in the network node 16 from which it receives/intends to receive the WUS. For example, the WD 22 may obtain information about WD transmit antennas configuration used in the cell by receiving information from the network node 16, e.g., via system information such as in master information blocks (MIB), system information blocks (SIB), etc. In another example, the WD 22 may obtain information about WD transmit antennas configuration used in the cell by blind determination, e.g., by autonomously detecting the presence of signals (e.g., reference signals) from the antennas. In yet another example, the WD 22 may obtain information about WD transmit antennas configuration used in the cell by pre-defined information, e.g., relation between the antenna configuration and carrier frequency or band used in the cell, or relation between the antenna configuration and the cell used in the cell. In yet another example, the WD 22 may obtain information about WD transmit antennas configuration used in the cell based on statistics or past history, e.g., antenna configuration used in that cell in previous times.

In one example, the network node 16 may support at least two different transmit antennas configurations, e.g., a first transmit antennas configuration (TX1) including one transmit antenna and a second transmit antennas configuration (TX2) including two transmit antennas. In yet another example, the first transmit antennas configuration comprises two transmit antennas and the second transmit antennas configuration include four transmit antennas. In yet another example, the network node 16 may support more than two transmit antenna configurations e.g., TX1, TX2 and a third transmit antennas configuration (TX3). The transmit antennas configuration including multiple antennas may further comprise one or more of: antenna switching, antenna combining, etc. For example, in antenna switching, the signals are transmitted on different antennas in different time resources in the cell. In this case, the WD 22 receives the WUS signals from one antenna at a time. In another example, in antenna combining, the signals are transmitted on different antennas in the same time resources in the cell. In this case, the WD 22 receives the WUS signals from multiple antennas at a time. Signals from multiple antennas in the same time resource or in different time resources may be assumed to be one repetition of the WUS signal.

Determining WD Activity Level

In a second step (block S152), the WD 22 determines an activity level of the WD 22. The activity level is an indication of a state of the WD synchronization with respect to the network (e.g., with respect to cell1) such that a lower WD activity level implies less synchronization and a higher WD activity level implies better synchronization. When the synchronization level is low, then the WD 22 may require larger number of attempts to receive the same signal compared to the case when the synchronization level is high. As an example, the WD activity level can be expressed or determined in terms of one or more of the following criteria:

DRX configuration of the WD 22; and/or

Type of service or application being used by the WD 22.

The above criteria are elaborated below with examples.

DRX Cycle Configuration:

The DRX related information obtained by the WD 22 is described above. The used DRX related information is known to the WD 22 since the WD 22 has received this configuration from the cell and uses it. The WD 22 may also obtain this information from a third-party node (which may be the case for IoT type of devices) or any other network devices. From this information, the WD 22 knows how frequent the WD 22 is going to be awake, for how long it is going to be awake, and its active time.

Since IoT type of devices are typically expected to be receiving or transmitting infrequent bursts of short data packets, the WD 22 may be configured with DRX configurations that allows the WD 22 to sleep for a long time and save its battery life. However, there might be different types of IoT WDs which require different types of DRX configurations. For example, one WD 22 deployed in an office environment might be configured to be awake relatively frequently while another WD 22 which is deployed in a farming field might be configured to be only awake occasionally during a day. The former WD 22 might be configured with normal DRX with a DRX length of 2.56 seconds while the latter WD 22 might be configured with eDRX with an eDRX length of 40+ minutes.

Similar to the DRX cycle lengths, the activity time may also differ depending on the WD 22 type.

In one embodiment, the activity level is determined indirectly by the DRX or eDRX cycle duration, the PTW duration and/or number of WUS attempts without a WUS being detected. For all the above cases, a longer duration implies a lower activity, in turn implying a need for longer WUS detection duration.

When a DRX cycle is longer, then the WD activity is considered to be low compared to the case when the DRX cycle is shorter. Also, when the DRX cycle is longer, then the WD synchronization level is low compared to the case when the DRX cycle is shorter. For example, the DRX cycle of 1280 ms is associated with lower WD activity level compared to the case when the DRX cycle is 320 ms.

Type of Service or Application:

The obtained information about the type of service or application may further include one or more of the following:

WD 22 type in terms of its mobility state; e.g., whether it is a stationary WD 22, or mobile WD 22, so semi-mobile device, etc. This in turn may indicate the type of service used by the WD 22. For example, a stationary WD 22, which can be a sensor, may transmit and/or receive data very infrequently, e.g., once every 15-30 minutes. In this case, the WD activity level may be considered low. But if the WD 22 exhibits some level of mobility (i.e., it moves frequently or occasionally), then its activity level is considered to be moderate or high. The mobility state should be known to the WD 22 and can be determined based on one or more of the following mechanisms: rate of cell changes (e.g., number handovers per unit time), Doppler speed of the WD 22 estimated by the WD 22 based on changes in measurements, or based on information received from other nodes in the network, e.g., positioning node, core-network, third-party node, etc.

A specific type of service or application for which the WD 22 is being used; e.g. for temperature monitoring, in houses for alarm monitoring, in buildings for detecting activity, in farming fields etc. This type of information can be obtained, for example, from one or more of:

a network node 16 storing information about the application or service used by the WD 22, e.g., by core network node 16, third-party node, etc.;

a third party node;

an application server;

subscription information or operator data;

a Subscriber Identification Module (SIM) card;

historical data or statistics; and/or estimation of traffic activity, e.g., average WD 22 bit rate, relation between average WD 22 bit rate and peak WD 22 bit rate, etc.

The mobility of the WD 22 may also depend on the type of service/application it uses. For example, IoT WDs 22 deployed in a field might be stationary while the IoT WDs 22 deployed in vehicles might be mobile.

Determining a WUS Repetition Level Based on Transmit Antenna Configuration and WD Activity Level In a third step (block S154), the WD 22 may determine a WUS repetition level that is required for receiving the WUS with a sufficient detection likelihood, based on determined information about at least the transmit antenna configuration and the WD activity level. The WUS signals are typically transmitted in consecutive DL time resources, e.g., over 8 DL subframes in the cell. The determined number of WUS repetition signals may further enable the WD 22 to determine the WUS detection time or the time to acquire the WUS signal in the WD 22. For example, in a FDD cell or HD-FDD cell, the WUS detection time for 8 WUS repetition will be at least 8 subframes or 8 ms. In a TDD cell with 4 DL subframes per frame, the WUS detection time for 8 WUS repetition will be at least 20 subframes or 20 ms (assuming 10th subframe (SF) is also a DL SF).

Below is described how the WD 22 uses the determined information about the transmit antenna configuration and the WD 22 activity level to determine the repetition number of WUS to successfully decode the WUS, i.e., with a good likelihood of not using more or less repetitions than a necessary number of WUS repetitions. The determination can be based on a relation between the number of WUS repetitions, the type of transmit antenna configuration and the WD activity level. The relation can be pre-defined (e.g., in terms of a pre-defined mapping table) or can be signaled to the WD 22 (e.g., in system information such as in a SIB).

Each repetition of the WUS may comprise a time resource, e.g., slot, subframe, TTI, sTTI, etc. All repetitions within one group of repetitions contains the same signal. This enables the WD receiver to combine all the repetitions within the same group to enhance the decoding performance.

In general, the number of WUS repetitions required by the WD 22 to decode the WUS increases with the increase in the DRX cycle length. The number of required WUS repetitions may further depend on a type of transmit antenna configuration used for transmitting the WUS.

For example, under shorter DRX cycles where the synchronization is relatively good, single antenna transmission can be sufficient to receive the WUS with good detection probability (e.g., ≤X % missed detection of the WUS signal, e.g., X=1% missed detected rate of the WUS signal). In this case, the WD 22 may not need large number of repetitions to receive the WUS.

In another example, under longer DRX cycles where the synchronization is coarser, single antenna transmission may not be sufficient for the WD 22 to receive WUSs with good detection probability. In this case, the missed detection rate can increase, e.g., to X=5% or X=10%. The consequences are twofold. First, the WD 22 may miss the paging, and may not respond to the network request if the WD 22 has been monitoring the paging for too short a duration. Secondly, if the WD 22 has been monitoring paging for too long a time, it may not achieve the power-saving gain that it can potentially achieve with the WUS. Therefore, it may be desirable to keep a low false alarm rate and missed detection probability. Here, false alarm probability (or rate) is the probability of falsely detecting the presence of a WUS at the WD 22 when no WUS is sent from the network node 16. The missed detection probability, which is computed by fixing the probability of false alarms, is the probability of not detecting the WUS when a WUS was actually sent.

This is elaborated with few specific examples below:

In a first example, the required number of repetitions or repetition level can be obtained by the WD 22 from a pre-defined mapping table as shown in Tables 1-2. In Table 1 and Table 2, the repetitions depend on both DRX cycle and antenna configuration. In this example, Table 1 and 2 are based on antenna configuration A and antenna configuration B, respectively. In antenna configuration A it is assumed that the WUS is transmitted in the cell using a single transmit antenna. In antenna configuration B it is assumed that the WUS is transmitted in the cell using two transmit antennas. In both Tables 1 and 2, the WD 22 CE level is a normal coverage level. In this example, the mapping tables can be determined based on the configured DRX length (as example of WD activity level), and transmit antenna configuration. The tables are pre-defined or configured by the network node 16 at the WD 22. The WD 22 carries out the decoding of a WUS using a suitable repetition based on the association between the transmit antenna configuration and the WD activity level (e.g., DRX cycle length).

TABLE 1

| DRX cycle length [s] | Required no. of Rep. at 1% FA Rate | Required no. of Rep. at 2% FA Rate | Required no. of Rep. at 5% FA Rate | Required no. of Rep. at 10% FA Rate |
|---|---|---|---|---|
| 1.28 | 2 | 1 | 1 | 1 |
| 2.56 | 2 | 2 | 1 | 1 |
| 5.12 | 2 | 2 | 1 | 1 |
| 10.24 | 32 | 16 | 16 | 8 |

TABLE 2

| DRX cycle length [s] | Required no. of Rep. at 1% FA Rate | Required no. of Rep. at 2% FA Rate | Required no. of Rep. at 5% FA Rate | Required no. of Rep. at 10% FA Rate |
|---|---|---|---|---|
| 1.28 | 2 | 2 | 2 | 2 |
| 2.56 | 2 | 2 | 2 | 2 |
| 5.12 | 2 | 2 | 2 | 2 |
| 10.24 | 2 | 2 | 2 | 2 |

In this example, Tables 3 and 4 are also based on antenna configuration A and antenna configuration B, respectively. But in Tables 3 and 4, the WD CE level is an enhanced coverage level.

These tables show that the required number of repetitions for receiving a WUS for a certain DRX cycle length depends highly on the antenna configuration. For example, the results in Table 1 and 2 show that under normal coverage, 32 repetitions are needed to achieve 1% false alarm rate and 99% detection probability with transmit antenna configuration A while 2 is sufficient when transmissions are based on transmit antenna configuration B. Configuration A is referred to a single transmit antenna based WUS transmission and configuration B is based on two transmit antenna transmissions.

TABLE 3

| DRX cycle length [s] | Required no. of Rep. at 1% FA Rate | Required no. of Rep. at 2% FA Rate | Required no. of Rep. at 5% FA Rate | Required no. of Rep. at 10% FA Rate |
|---|---|---|---|---|
| 1.28 | 256 | 256 | 256 | 128 |
| 2.56 | 256 | 256 | 256 | 128 |
| 5.12 | 256 | 256 | 256 | 256 |
| 10.24 | 512 | 512 | 512 | 512 |

TABLE 4

| DRX cycle length [s] | Required no. of Rep. at 1% FA Rate | Required no. of Rep. at 2% FA Rate | Required no. of Rep. at 5% FA Rate | Required no. of Rep. at 10% FA Rate |
| --- | --- | --- | --- | --- |
| 1.28 | 64 | 64 | 64 | 32 |
| 2.56 | 64 | 64 | 64 | 32 |
| 5.12 | 128 | 64 | 64 | 32 |
| 10.24 | 256 | 256 | 256 | 256 |

According to a second aspect of this embodiment, the WD 22 further determines a coverage enhancement (CE) level of the WD 22 with respect to the cell. The WD 22 further determines a WUS repetition level that is required for receiving the WUS with a sufficient detection likelihood, based on determined information on the transmit antenna configuration, the WD activity level and the WD CE level. The impact of antenna configuration for transmitting the WUS at different WD activity levels further increases with increased coverage levels. As the WD 22 starts to operate under a deep coverage enhancement level while configured with a DRX cycle length, the synchronization accuracy also degrades. This will require even larger number of repetitions to decode the WUS with sufficient likelihood. For example, for the same transmit antenna configuration and same the WD activity level, the required number of WUS repetitions will be larger for larger CE level compared to the case with smaller CE level. In essence, the WD 22 selects the repetition level based on relation between the determined transmit antenna configuration, the WD activity level and the CE level, in some embodiments.

This second aspect of the WD embodiment is described using a second example including Table 1 and Table 3. Table 1 and Table 3 are based on the same type of the antenna configuration, which is configuration A (i.e. single antenna). But Table 1 and Table 3 differ in terms of the WD CE level. Table 3 is associated with the enhanced CE level. The comparison shows that the required number of WUS repetitions is higher under enhanced CE level compared to those under normal CE level for the same antenna configuration and WD DRX cycle. As such, the number of WUS repetitions may be considered as dependent on whether a coverage level of the WD is enhanced or normal.

This second aspect of the WD embodiment is further described using a third example including Table 2 and Table 4. Table 2 and Table 4 are based on the same type of antenna configuration, which is configuration B (i.e., two antennas). But Table 2 and Table 4 also differ in terms of the WD CE level. Table 4 is associated with the enhanced CE level. The comparison shows that the required number of WUS repetitions is higher under enhanced CE level compared to those under normal CE level for the same antenna configuration and WD DRX cycle. Depending on antenna configuration used for transmitting the WUS, the WD 22 may use different algorithms to decode the WUS. The different algorithms may be characterized by, e.g., the following:

Receiving signals from multiple antennas transmitted at the same/different time instances (or frequency) and apply a diversity-combining technique on the received signal(s). Receiving from multiple antennas and selecting the strongest branch.

Switching reception between multiple antennas e.g., every subframe, every other subframe, etc.

The impact of antenna configuration for transmitting the WUS at different WD activity levels further increases with increased coverage levels. As the WD 22 starts to operate under deep coverage enhancement level while configured with a DRX cycle length, the synchronization accuracy also degrades. This will require even larger number of repetitions to decode the WUS with sufficient likelihood. Results in Tables 3 and 4 show that under enhanced coverage when configured with DRX cycle length of 1.28 ms, the WD 22 may need 256 repetitions to receive the WUS using antenna configuration A, while a corresponding repetition number is only 64 when antenna configuration B is used. This is a significant difference.

The above principle can be applied to any number of antenna configurations, e.g., with 4 transmit antennas, 8 transmit antennas, 16 transmit antennas, etc. The expected gain may increase with the number of transmit antennas, but may also be based on operational scenarios. For example, under challenging scenarios such as enhanced coverage with longer DRX cycles, antenna configuration B can bring more gains (in terms of fewer repetitions) than antenna configuration A, etc.

The required number of repetitions (as shown in Tables 1-4) and their relation to DRX cycle lengths and antenna configurations can be pre-defined in the specification. It can be predefined and signaled to the WD 22. The WD 22 may indicate this to the network or network node 16 may indicate which table to use.

Detecting WUS Signal Based on Based on Obtained Information

Finally (blocks S156, S158), the WD 22 attempts to decode the WUS, based on the WUS repetition level determined in the previous step and based on whether operating under procedure A or procedure B.

The WD 22 uses the results of the decoded WUS signal to decide whether to continue attempts to decode the subsequent DL control channel (xPDCCH), or the WD 22 can switch to inactive mode (i.e., turn off the receiver chain until the next WD active period).

If the WD 22 successfully decodes the WUS, then it may start decoding other related DL channels, e.g., MPDCCH or NPDCH, to acquire paging. But if the WD 22 cannot successfully decode the WUS, then the WD 22 may not attempt to decode other related DL channels and may instead go to sleep.

Methods in a Network Node

Figure 12:
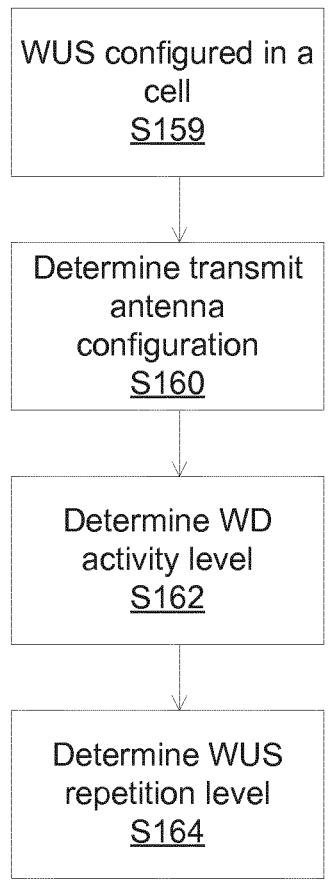
FIG. 12 is a flowchart of an exemplary process in a network node according to some embodiments of the present disclosure.
Figure 13:
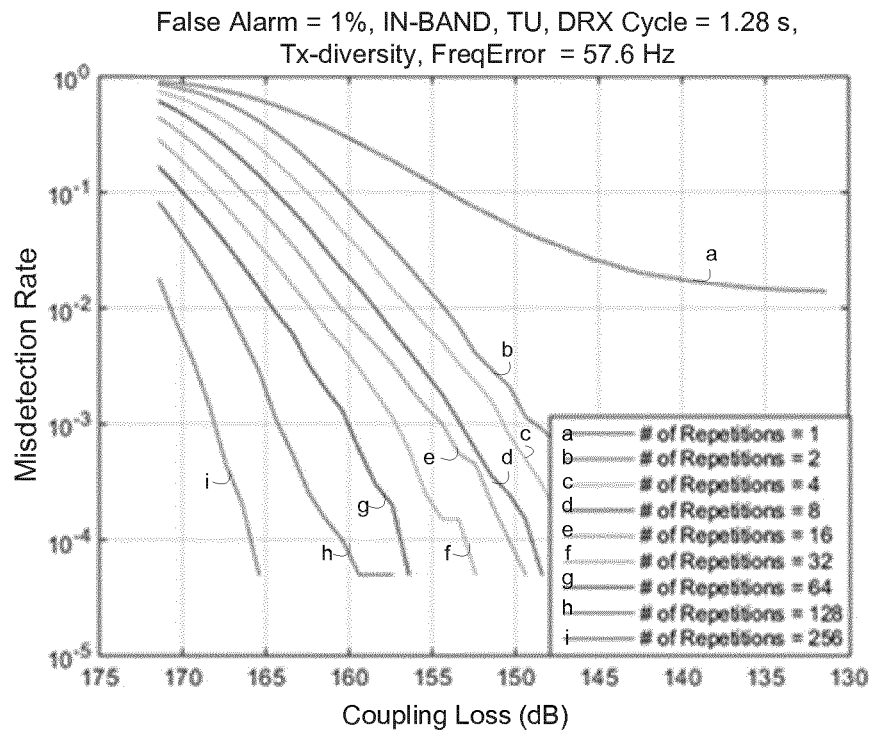
FIG. 13 illustrates transmit diversity simulation results for WUS reception performance for DRX cycle of 1.28 seconds (s) according to some embodiments of the present disclosure.
Figure 14:
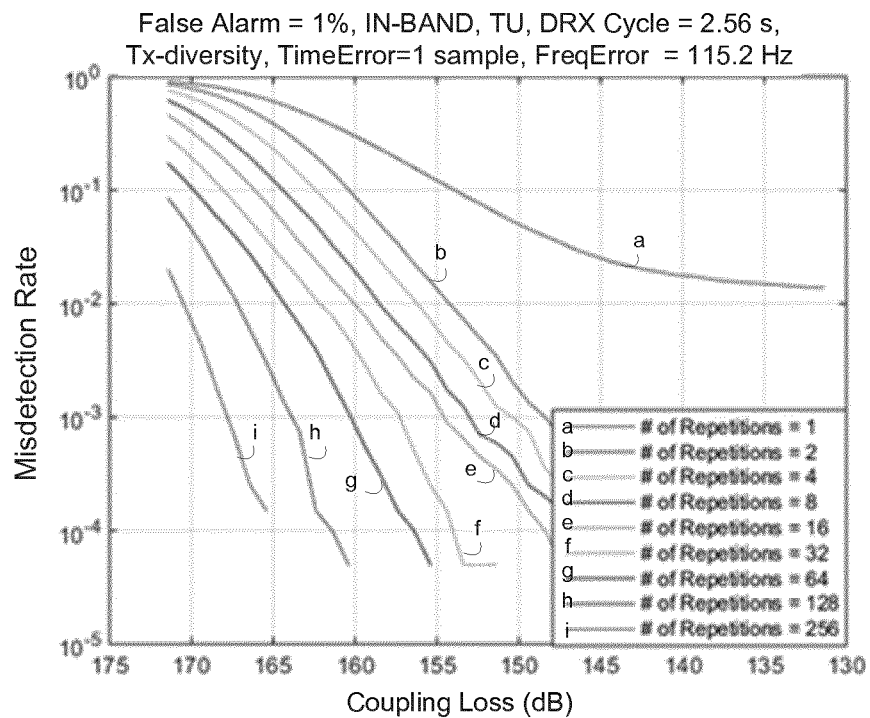
FIG. 14 illustrates transmit diversity simulation results for WUS reception performance for DRX cycle of 2.56 s according to some embodiments of the present disclosure.
Figure 15:
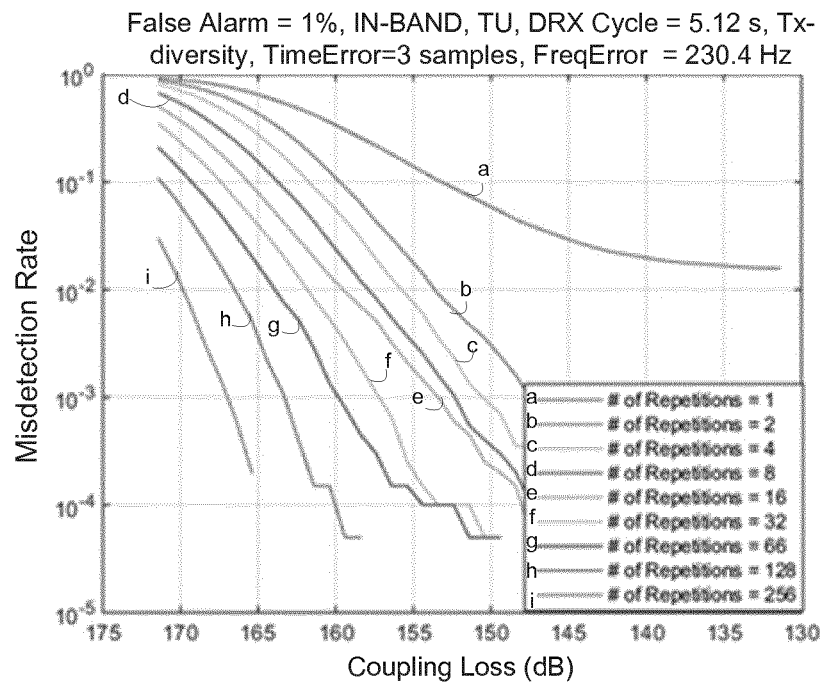
FIG. 15 illustrates transmit diversity simulation results for WUS reception performance for DRX cycle of 5.12 s according to some embodiments of the present disclosure.
Figure 16:
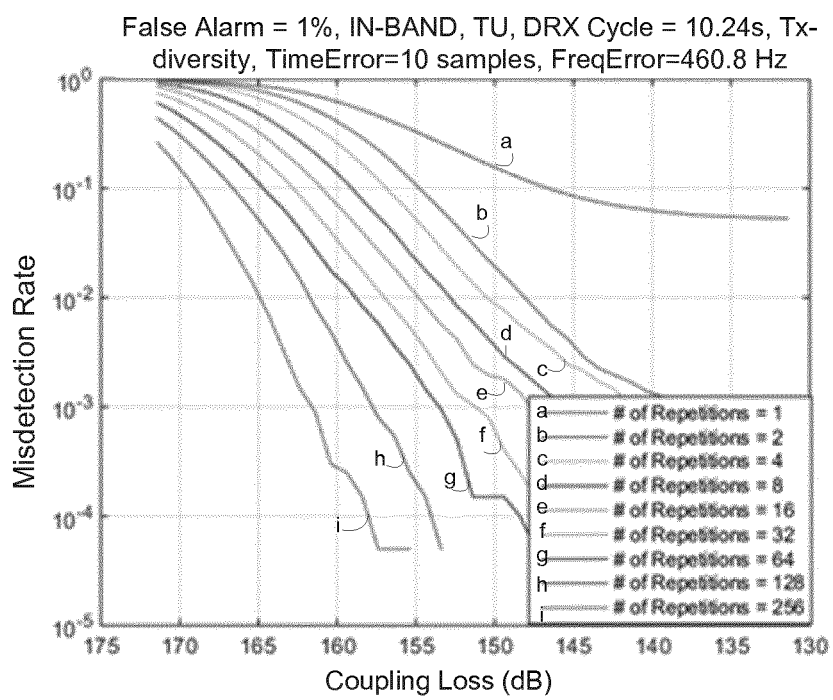
FIG. 16 illustrates transmit diversity simulation results for WUS reception performance for DRX cycle of 10.24 s according to some embodiments of the present disclosure.
Figure 17:
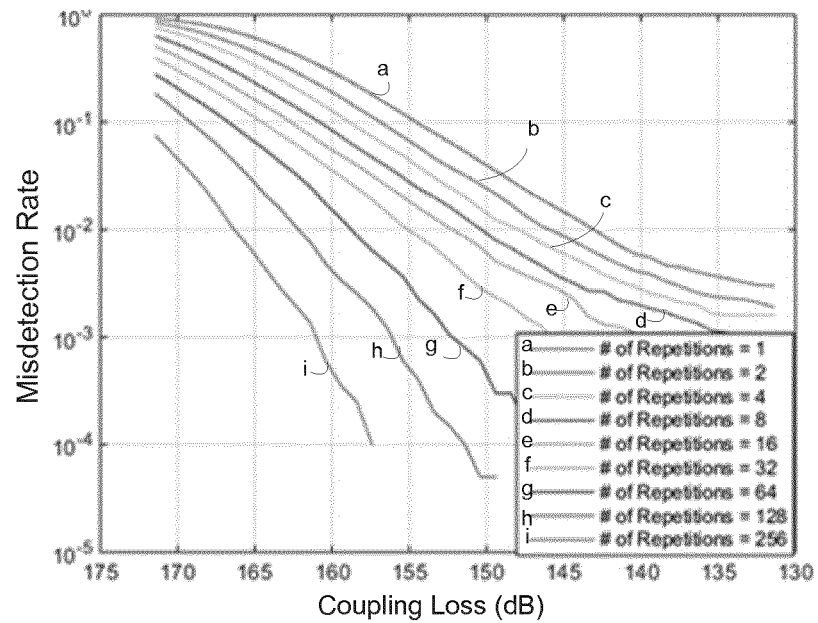
FIG. 17 illustrates single antenna based WUS transmissions simulations results for WUS reception performance for DRX cycle of 1.28 s according to some embodiments of the present disclosure.
Figure 18:
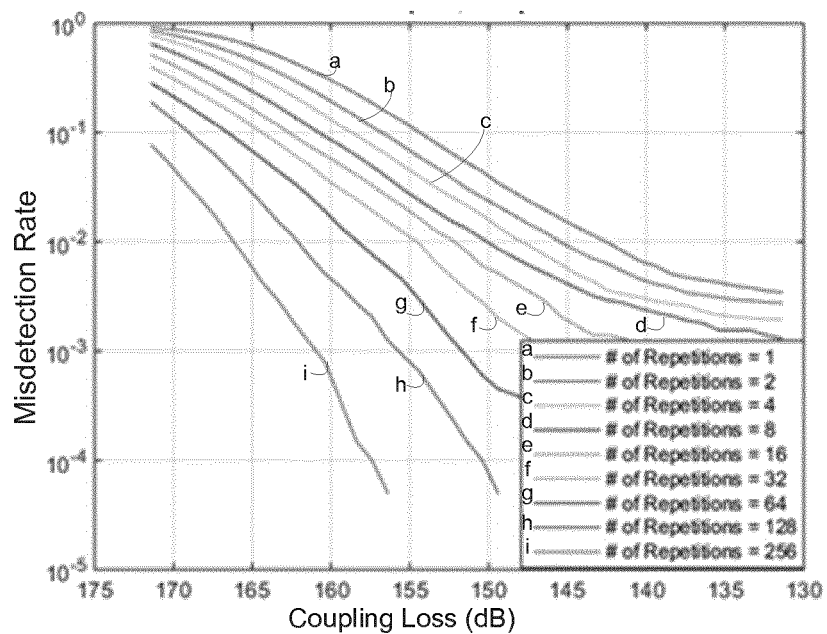
FIG. 18 illustrates single antenna based WUS transmissions simulations results for WUS reception performance for DRX cycle of 2.56 s according to some embodiments of the present disclosure.
Figure 19:
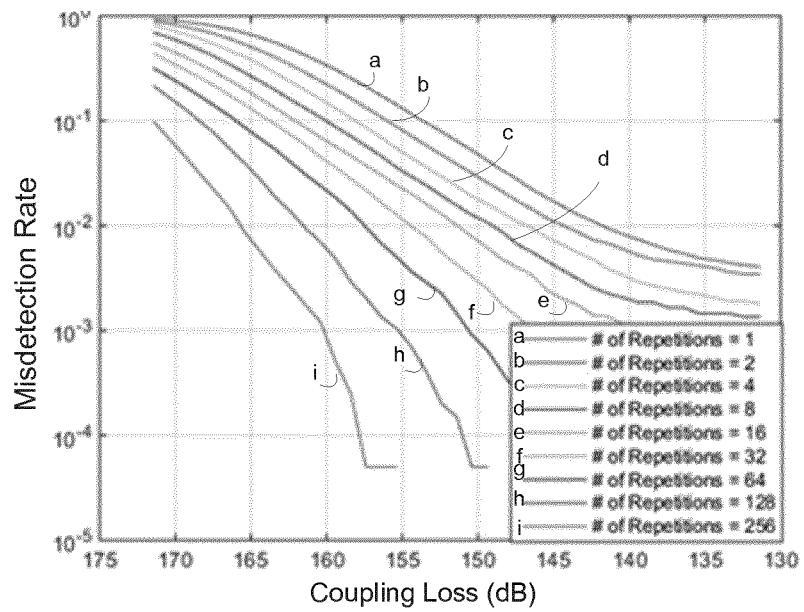
FIG. 19 illustrates single antenna based WUS transmissions simulations results for WUS reception performance for DRX cycle of 5.12 s according to some embodiments of the present disclosure.
Figure 20:
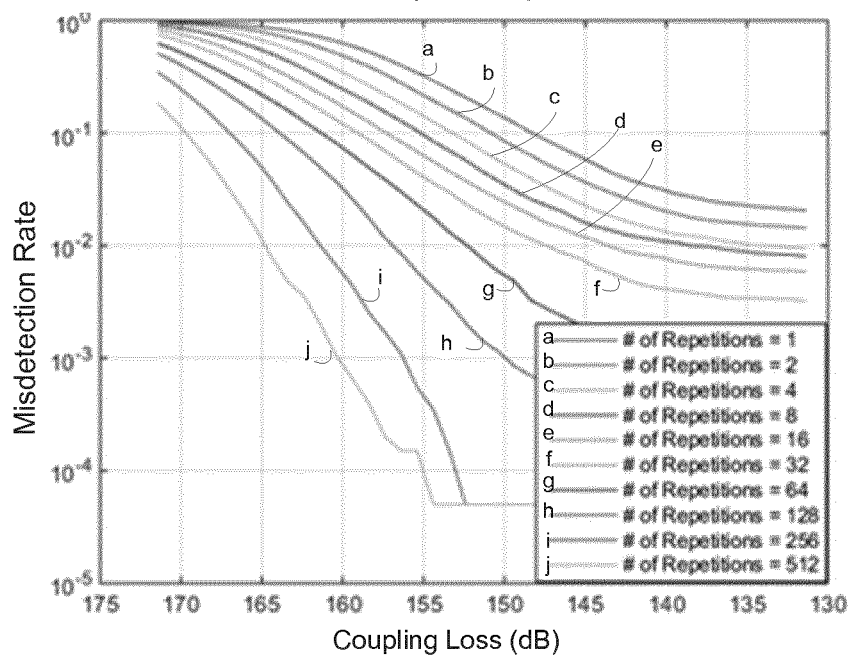
FIG. 20 illustrates single antenna based WUS transmissions simulations results for WUS reception performance for DRX cycle of 10.24 s according to some embodiments of the present disclosure.

A method in a network node 16 is summarized and described with reference to FIG. 12. As shown by the unnumbered box, the process of FIG. 12 assumes the WUS is configured for a cell (block S159).

Determining Transmit Antenna Configuration

In a first step (block S160), the network node 16 obtains/determines information about the WD transmit antenna configurations used in the network node 16 for transmitting the WUS. The obtained information may also include type of antenna configuration that can be supported by the network, but not currently being used. The step involved in determination of the transmit antenna configuration is similar to that described for the WD.

Determining WD Activity Level

In a second step (block S162), the network node 16 determines an activity level of the WD 22. The step involved in determining the WD activity level is similar to that described for the wireless device.

Adapting WUS Transmission Parameters

In a third step (block S164), the network node 16 adapts the WUS transmission parameters based on obtained information about transmit antenna configuration and WD activity level. The adaptation can be twofold. First, the network node 16 determines the required number of repetitions based on the obtained information of antenna configuration and DRX cycle, and transmitting the WUS according to that repetition level. The steps involved in determining the repetition level is similar to those described for the WD 22.

Second, the adaptation may also include transmitting the WUS using a modified transmit antenna configuration than initially planned or previously used based on obtained information on antenna configuration and WD activity level. For example, the network node 16 may switch from antenna configuration A to antenna configuration B when the WD activity level changes, where configuration B is assumed to be more advanced and include multiple antennas. In a more specific example, the network node 16 may start transmitting the WUS using 2 transmit antennas instead of 1 when the DRX cycle length changes from 1.28 s to 10.28 s.

In addition, some embodiments may include one or more of the following features.

WUS Receptions for (e.g., NB-IOT WDs)

In some embodiments, one or more of the following may be required and/or configured for the WD (e.g., WD 22 and/or UE) regarding WUS reception provided that the WUS has been configured in the serving NB-IoT cell.

The WD may be capable of receiving the WUS signals of the serving NB-IoT cell provided that the minimum number of repetitions configured in the NB-IoT serving cell is according to the following tables, Table 5 for normal coverage and Table 6 for enhanced coverage.

TABLE 5

Conditions for WUS reception for WD/UE normal coverage level

| DRX cycle length [s] | Required number of repetitions of WUS signal with 1 transmit antenna | Required number of repetitions of WUS signal with 2 transmit antennas |
|---|---|---|
| 1.28 | 1 | 2 |
| 2.56 | 2 | 2 |
| 5.12 | 2 | 2 |
| 10.24 | 16 | 2 |

TABLE 6

Conditions for WUS reception for WD/UE enhanced coverage level

| DRX cycle length [s] | Required number of repetitions of WUS signal with 1 transmit antenna | Required number of repetitions of WUS signal with 2 transmit antennas |
|---|---|---|
| 1.28 | 256 | 64 |
| 2.56 | 256 | 64 |
| 5.12 | 256 | 128 |
| 10.24 | 512 | 256 |

Simulation Results for WUS Reception for NB-IoT

The current release 15 NB-IoT WUS reception requirements defined in section 4.6.2.9 in Third Generation Partnership Project (3GPP) Technical Specification (TS) 36.133, V15.3.0 contains numerous items to be determined (TBDs). In this disclosure, the simulation results for WUS reception performance for different DRX cycle lengths and coverage levels are presented with the aim to resolve one or more of these TBDs.

The simulations are carried out based on certain agreed RAN1 simulation assumptions in, for example, R1-1714993. The table below provides one or more of the assumptions.

TABLE 7

Simulation assumption for WUS

| Parameter | Value |
|---|---|
| Base station (BS) TX antenna configuration | 1 Tx for standalone, 2 Tx for in-band/guard-band |
| BS power | 43 dBm for standalone, 35 dBm for in-band/guard-band |
| System bandwidth (BW) | 180 kHz |
| Band | 900 MHz |
| Channel model | TU 1 |
| Doppler spread | 1 Hz |
| LO XO frequency drift, when not relying on downlink (DL) synchronization (light sleep) | ±0.05 ppm/s |
| LO XO maximum frequency error, when not relying on DL synchronization (light sleep) | ±5 ppm |
| LO XO frequency error, when relying on DL synchronization (receive) | ±50 Hz |
| RTC maximum frequency error (deep sleep) | ±20 ppm |
| WD/UE RX antenna configuration | 1 Rx |
| UE NF | 5 dB, 9 dB |
| Coupling loss | 144, 154, 164 dB |

Simulation results showing transmit diversity results are depicted in FIGS. 13-16.

Simulation results showing results for single antenna based WUS transmissions are depicted in FIGS. 17-20.

The results are summarized in Table 8.

TABLE 8

Conditions for WUS reception for at 1% false alarm (FA) and 99% detection probability with and without transmit diversity

| DRX cycle length [s] | Required no. of Rep. for normal coverage with Tx-Div | Required no. of Rep. for normal coverage w/o Tx-Div | Required no. of Rep. for enhanced coverage with Tx-Div | Required no. of Rep. for enhanced coverage w/o Tx-Div |
|---|---|---|---|---|
| 1.28 | 2 | 2 | 64 | 256 |
| 2.56 | 2 | 2 | 64 | 256 |
| 5.12 | 2 | 2 | 128 | 256 |
| 10.24 | 2 | 16 | 256 | 512 |

Based on the results, following observations are made, one or more of which may be included in and/or affect one or more embodiments of the present disclosure:

Observation #1: Significant difference in required number of WUS repetitions between normal- and enhanced coverage.

Observation #2: WUS transmission using 2 transmit antennas reduces the required number of WUS significantly, especially in enhanced coverage.

Proposal: RAN4 to define minimum WUS reception requirements assuming both 1 transmit antenna and two transmit antennas.

In this disclosure, the simulation results for minimum WUS reception performance for release 15 feNB-IoT are presented. Based on the results, following observations are made, one or more of which may be included in and/or affect one or more embodiments of the present disclosure:

Observation #1: Significant difference in required number of WUS repetitions between normal- and enhanced coverage.

Observation #2: WUS transmission using 2 Tx antennas reduces the required number of WUS significantly, especially in enhanced coverage.

Proposal #1: RAN4 to define minimum WUS reception requirements assuming both 1 transmit antenna and two transmit antennas.

Proposal #2: The TBDs in current minimum WUS reception requirements are replaced by the numbers in Table 8 above.

Some embodiments may include one or more of the following:

Embodiment A1. A network node configured to communicate with a wireless device (WD), the network node configured to, and/or comprising a radio interface and/or comprising processing circuitry configured to:
determine a WD activity level;
select a transmit antenna configuration; and
determine a number of wake up signal, WUS, repetitions based on the WD activity level and the transmit antenna configuration; and
transmit to the WD a WUS repetitively according to the determined number of WUS repetitions.

Embodiment A2. The network node of Embodiment A1, wherein the WD activity level includes at least one of a discontinuous reception, DRX, cycle length and a WD bit rate.

Embodiment A3. The network node of any of Embodiments A1 and A2, wherein the WD activity level is indicative of a state of network synchronization, a lower activity level indicating less synchronization and a higher activity level indicating greater synchronization.

Embodiment A4. The network node of any of Embodiments A1-A3, wherein the transmit antenna configuration includes a number of transmit antennas used to transmit the WUS.

Embodiment A5. The network node of any of Embodiments of A1-A4, wherein information about the transmit antenna configuration is transmitted to the WD.

Embodiment B1. A method implemented in a network node, the method comprising:
determining a WD activity level;
selecting a transmit antenna configuration;
determining a number of wake up signal, WUS, repetitions based on the WD activity level and the transmit antenna configuration; and
transmitting to the WD a WUS repetitively according to the determined number of WUS repetitions.

Embodiment B2. The method of Embodiment B1, wherein the WD activity level includes at least one of a discontinuous reception, DRX, cycle length and a WD bit rate.

Embodiment B3. The method of any of Embodiments B1 and B2, wherein the WD activity level is indicative of a state of network synchronization, a lower activity level indicating less synchronization and a higher activity level indicating greater synchronization.

Embodiment B4. The method of any of Embodiments B1-B3, wherein the transmit antenna configuration includes a number of transmit antennas used to transmit the WUS.

Embodiment B5. The method of any of Embodiments of B1-B4, wherein information about the transmit antenna configuration is transmitted to the WD.

Embodiment C1. A wireless device (WD) configured to communicate with a network node, the WD configured to, and/or comprising a radio interface and/or processing circuitry configured to:
receive information about a transmit antenna configuration from the network node;
determine an activity level of the WD;
determine a number of wake up signal, WUS, repetitions based on the transmit antenna configuration and the activity level; and
decode a WUS by combining WUS transmissions received a number of times equal to the determined number of WUS repetitions.

Embodiment C2. The WD of Embodiment C1, wherein the activity level is a discontinuous reception, DRX, cycle length, and the number of WUS repetitions is selected from a table of repetition rates versus DRX cycle length, the table from which the number of WUS repetitions is selected depending on the transmit antenna configuration.

Embodiment C3. The WD of Embodiment C2, wherein the table from which the number of WUS repetitions is selected further depends on whether a coverage level of the WD is enhanced, wherein a number of WUS repetitions required to decode the WUS increases with the coverage level.

Embodiment C4. The WD of Embodiment C3, wherein the coverage level is expressed as one of a received signal quality and a received signal strength, so that the number of WUS repetitions depends on the one of the received signal quality and the received signal strength.

Embodiment C5. The WD of any of Embodiments C1-C4, wherein an algorithm used to decode the WUS is characterized by one of application of a diversity-combining technique on the received wake up signals and switching reception between multiple antennas.

Embodiment D1. A method implemented in a wireless device (WD), the method comprising:
receiving information about a transmit antenna configuration from the network node;
determining an activity level of the WD;
determining a number of wake up signal, WUS, repetitions based on the transmit antenna configuration and the activity level; and
decoding a WUS by combining WUS transmissions received a number of times equal to the determined number of WUS repetitions.

Embodiment D2. The method of Embodiment D1, wherein the activity level is a discontinuous reception, DRX, cycle length, and the number of WUS repetitions is selected from a table of repetition rates versus DRX cycle length, the table from which the number of WUS repetitions is selected depending on the transmit antenna configuration.

Embodiment D3. The method of Embodiment D2, wherein the table from which the number of WUS repetitions is selected further depends on whether a coverage level of the WD is enhanced, wherein a number of WUS repetitions required to decode the WUS increases with the coverage level.

Embodiment D4. The method of Embodiment D3, wherein the coverage level is expressed as one of a received signal quality and a received signal strength, so that the number of WUS repetitions depends on the one of the received signal quality and the received signal strength.

Embodiment D5. The method of any of Embodiments D4, wherein an algorithm used to decode the WUS is characterized by one of application of a diversity-combining technique on the received wake up signals and switching reception between multiple antennas.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device, WD, configured to communicate with a network node, the WD comprising processing circuitry, the processing circuitry being configured to cause the WD to:
   determine information about a transmit antenna configuration of the network node;
   determine information about an activity level of the WD, the activity level being a discontinuous reception, DRX, cycle length; and
   receive a WUS signal, the WUS signal comprising a number of WUS repetitions based on the transmit antenna configuration and the activity level.

2. The WD of claim 1, wherein the processing circuitry is further configured to cause the WD to:
   at least one of:
   A) determine a number of wake up signal, WUS, repetitions based on the transmit antenna configuration and the activity level; and
      receive a WUS signal, the WUS signal comprising at least the determined number of WUS repetitions; and
   B) cause the WD to:
      when the WUS signal is received, monitor a control channel.

3. The WD of claim 1, wherein the processing circuitry is further configured to cause the WD to receive the WUS signal by being configured to cause the WD to:
one of:
decode the WUS signal according to the determined number of WUS repetitions; and
cause the WD to decode the WUS signal according to the determined number of WUS repetitions by being configured to cause the WD to:
combine WUS transmissions received a number of times equal to the determined number of WUS repetitions.

4. The WD of claim 1, wherein the processing circuitry is further configured to cause the WD to determine the number of WUS repetitions based on the transmit antenna configuration and the activity level by being configured to cause the WD to one of:
select the number of WUS repetitions from a table, the table mapping repetitions to DRX cycle lengths;
select the number of WUS repetitions from a table the table mapping repetitions to DRX cycle lengths, the table from which the number of WUS repetitions being selected depending on whether a coverage level of the WD is enhanced; and
select the number of WUS repetitions from a table the table mapping repetitions to DRX cycle lengths, the table from which the number of WUS repetitions being selected depending on whether a coverage level of the WD is enhanced, the coverage level being expressed as one of a received signal quality and a received signal strength, such that the number of WUS repetitions depends on the one of the received signal quality and the received signal strength.

5. The WD of claim 1, wherein one of:
the information about the transmit antenna configuration of the network node comprises a number of transmit antennas used by the network node for transmitting the WUS signal; and
the information about the transmit antenna configuration of the network node comprises a number of transmit antennas used by the network node for transmitting the WUS signal, wherein the number of transmit antennas is one of 1 transmit antenna and 2 transmit antennas.

6. The WD of claim 1, wherein at least one of:
the processing circuitry is further configured to cause the WD to determine the number of WUS repetitions by being configured to cause the WD to determine the number of WUS repetitions based on the activity level being one of equal to 5.12 seconds, greater than 5.12 seconds and less than 5.12 seconds; and
the WD is one of a Machine Type Communication, MTC, WD and a Narrowband Internet of Things, NB-IoT, WD.

7. A network node configured to communicate with a wireless device, WD, the network node comprising processing circuitry, the processing circuitry being configured to cause the network node to:
obtain information about an activity level of the WD, the activity level of the WD is a discontinuous reception, DRX, cycle length;
select a transmit antenna configuration;
determine a number of wake up signal, WUS, repetitions based on the transmit antenna configuration and the activity level; and
transmit a WUS signal, the WUS signal comprising at least the determined number of WUS repetitions.

8. The network node of claim 7, wherein the processing circuitry is further configured to cause the network node to at least one of:
transmit the WUS signal if a control channel is to be transmitted;
subsequent to transmitting the WUS signal, transmit the control channel;
select the transmit antenna configuration to include a number of transmit antennas to be used to transmit the WUS signal; and
transmit the WUS signal by being configured to transmit the WUS signal using the number of transmit antennas; and
transmit information about the selected transmit antenna configuration to the WD.

9. The network node of claim 7, wherein the processing circuitry is further configured to cause the network node to determine the number of WUS repetitions based on the transmit antenna configuration and the activity level by being configured to cause the network node to one of:
select the number of WUS repetitions from a table, the table mapping repetitions to DRX cycle lengths;
select the number of WUS repetitions from a table, the table mapping repetitions to DRX cycle lengths, wherein the table from which the number of WUS repetitions is selected depends on whether a coverage level of the WD is enhanced; and
select the number of WUS repetitions from a table, the table mapping repetitions to DRX cycle lengths, wherein the table from which the number of WUS repetitions is selected depends on whether a coverage level of the WD is enhanced, wherein the coverage level is expressed as one of a received signal quality and a received signal strength, such that the number of WUS repetitions depends on the one of the received signal quality and the received signal strength.

10. The network node of claim 7, wherein one of:
the selected transmit antenna configuration comprises a selected number of transmit antennas to transmit the WUS signal; and
the selected transmit antenna configuration comprises a selected number of transmit antennas to transmit the WUS signal, wherein the selected number of transmit antennas is one of 1 transmit antenna and 2 transmit antennas.

11. The network node of claim 7, wherein at least one of:
the processing circuitry further configured to cause the network node to determine the number of WUS repetitions by being configured to cause the network node to determine the number of WUS repetitions based on the activity level being one of equal to 5.12 seconds, greater than 5.12 seconds and less than 5.12 seconds; and
the WD is one of a Machine Type Communication, MTC, WD and a Narrowband Internet of Things, NB-IoT, WD.

12. A method implemented in a wireless device, WD, the method comprising:
determining information about a transmit antenna configuration of a network node;
determining information about an activity level of the WD, the activity level being a discontinuous reception, DRX, cycle length; and
receiving a WUS signal, the WUS signal comprising a number of WUS repetitions based on the transmit antenna configuration and the activity level.

13. The method of claim 12, further comprising at least one of:
- A) determining a number of wake up signal, WUS, repetitions based on the transmit antenna configuration and the activity level; and
  receiving a WUS signal, the WUS signal comprising at least the determined number of WUS repetitions;
- B) when the WUS signal is received, monitoring a control channel;
- C) receiving the WUS signal further comprises one of:
  decoding the WUS signal according to the determined number of WUS repetitions; and
  decoding the WUS signal according to the determined number of WUS repetitions comprises combining WUS transmissions received a number of times equal to the determined number of WUS repetitions;
- D) determining the number of WUS repetitions based on the transmit antenna configuration and the activity level further comprises one of:
  selecting the number of WUS repetitions from a table, the table mapping repetitions to DRX cycle lengths; and
  selecting the number of WUS repetitions from a table, the table mapping repetitions to DRX cycle lengths, wherein the table from which the number of WUS repetitions is selected depends on whether a coverage level of the WD is enhanced; and
  selecting the number of WUS repetitions from a table, the table mapping repetitions to DRX cycle lengths, wherein the table from which the number of WUS repetitions is selected depends on whether a coverage level of the WD is enhanced, and wherein the coverage level is expressed as one of a received signal quality and a received signal strength, such that the number of WUS repetitions depends on the one of the received signal quality and the received signal strength.

14. The method of claim 12, wherein one of:
the information about the transmit antenna configuration of the network node comprises a number of transmit antennas used by the network node for transmitting the WUS signal; and
the information about the transmit antenna configuration of the network node comprises a number of transmit antennas used by the network node for transmitting the WUS signal, wherein the number of transmit antennas is one of 1 transmit antenna and 2 transmit antennas.

15. The method of claim 12, wherein at least one of:
determining the number of WUS repetitions further comprises determining the number of WUS repetitions based on the activity level being one of equal to 5.12 seconds, greater than 5.12 seconds and less than 5.12 seconds; and
the WD is one of a Machine Type Communication, MTC, WD and a Narrowband Internet of Things, NB-IoT, WD.

16. A method implemented in a network node, the method comprising:
obtaining information about an activity level of a wireless device, WD, the activity level of the WD being a discontinuous reception, DRX, cycle length;
selecting a transmit antenna configuration;
determining a number of wake up signal, WUS, repetitions based on the transmit antenna configuration and the activity level; and
transmitting a WUS signal, the WUS signal comprising at least the determined number of WUS repetitions.

17. The method of claim 16, wherein at least one of:
the transmitting the WUS signal further comprises transmitting the WUS signal if a control channel is to be transmitted;
subsequent to transmitting the WUS signal, transmitting the control channel;
the selected transmit antenna configuration includes a number of transmit antennas to be used to transmit the WUS signal;
transmitting the WUS signal further comprises transmitting the WUS signal using the number of transmit antennas; and
transmitting information about the selected transmit antenna configuration to the WD.

18. The method of claim 16, wherein the determining the number of WUS repetitions based on the transmit antenna configuration and the activity level further comprises:
selecting the number of WUS repetitions from a table, the table mapping repetitions to DRX cycle lengths;
selecting the number of WUS repetitions from a table, the table mapping repetitions to DRX cycle lengths, wherein the table from which the number of WUS repetitions is selected depends on whether a coverage level of the WD is enhanced; and
selecting the number of WUS repetitions from a table, the table mapping repetitions to DRX cycle lengths, wherein the table from which the number of WUS repetitions is selected depends on whether a coverage level of the WD is enhanced, wherein the coverage level is expressed as one of a received signal quality and a received signal strength, such that the number of WUS repetitions depends on the one of the received signal quality and the received signal strength.

19. The method of claim 16, wherein one of:
the selected transmit antenna configuration comprises a selected number of transmit antennas to transmit the WUS signal; and
the selected transmit antenna configuration comprises a selected number of transmit antennas to transmit the WUS signal, wherein the selected number of transmit antennas is one of 1 transmit antenna and 2 transmit antennas.

20. The method of claim 16, wherein one of:
determining the number of WUS repetitions further comprises determining the number of WUS repetitions based on the activity level being one of equal to 5.12 seconds, greater than 5.12 seconds and less than 5.12 seconds; and
the WD is one of a Machine Type Communication, MTC, WD and a Narrowband Internet of Things, NB-IoT, WD.

\* \* \* \* \*